Figure 31:
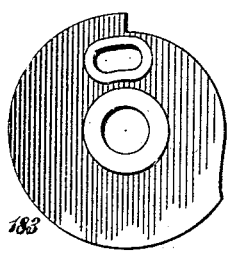
Figure 32:
Figure 37:
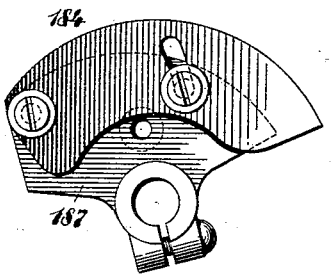
Figure 38:
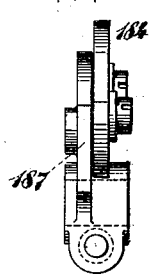
Figure 33:
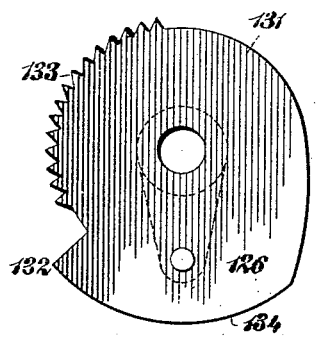
Figure 34:

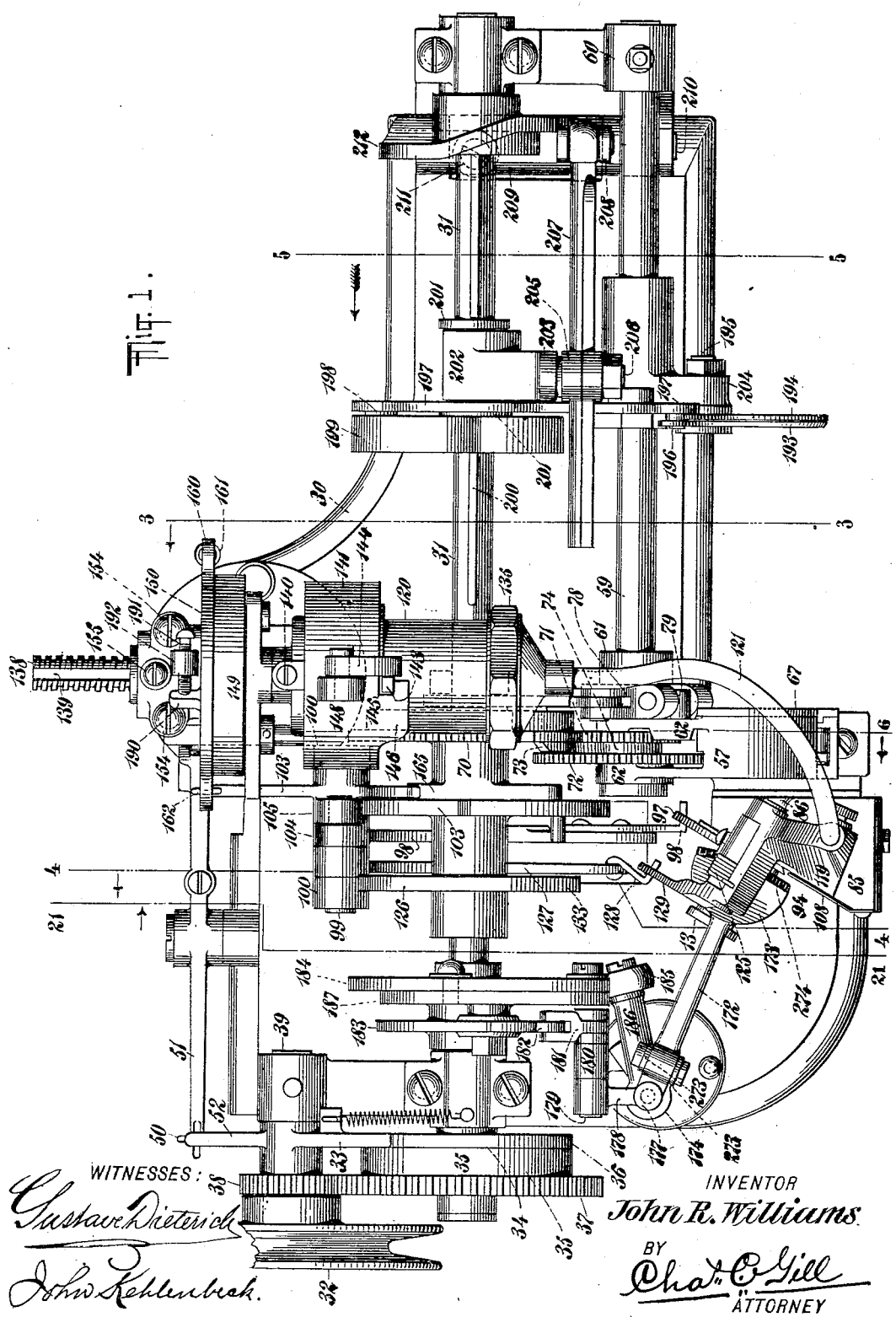

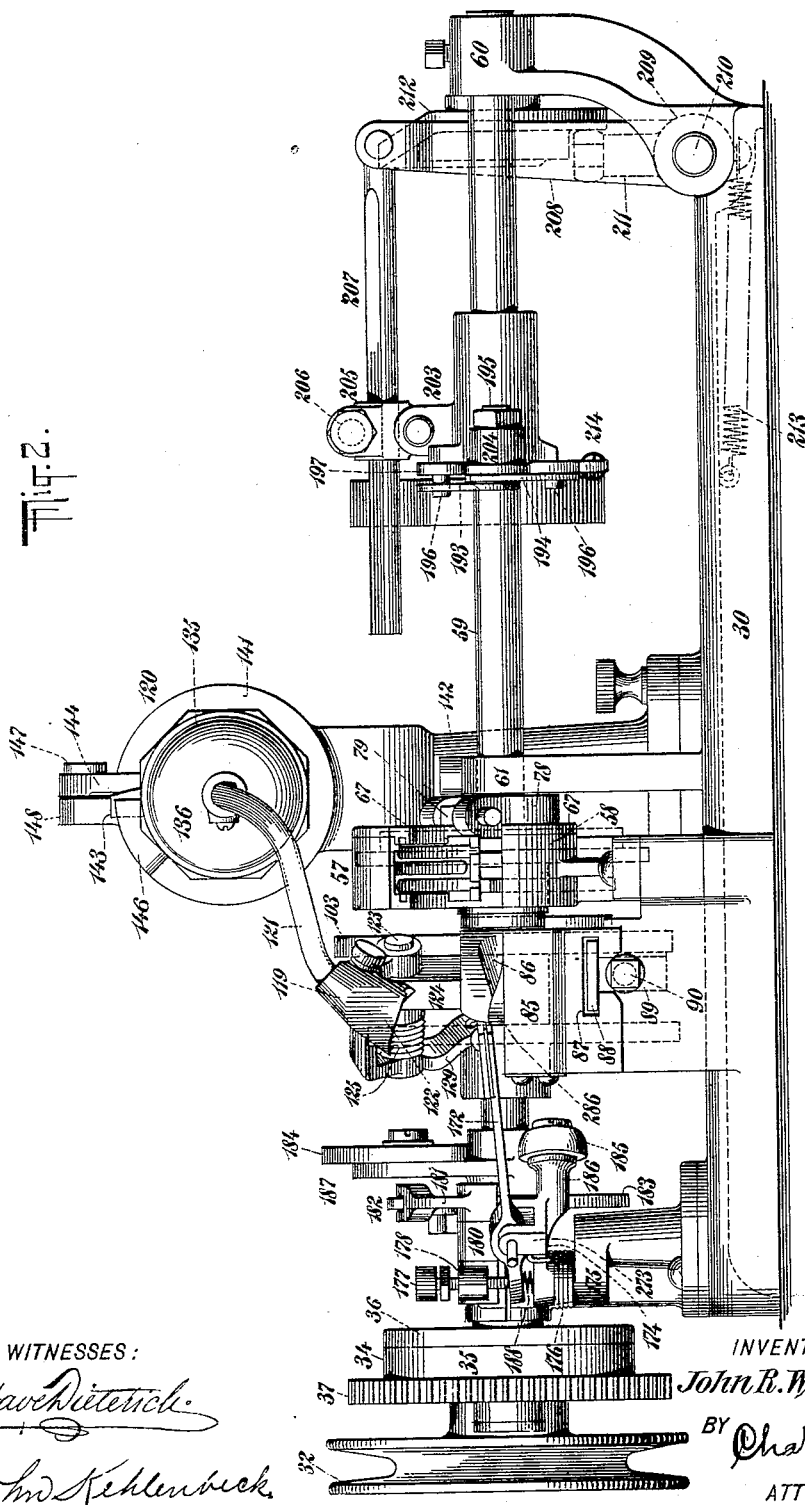

No. 664,918. Patented Jan. 1, 1901.
J. R. WILLIAMS.
CIGAR MAKING MACHINE.
(Application filed June 16, 1900.)
(No Model.) 8 Sheets—Sheet 3.
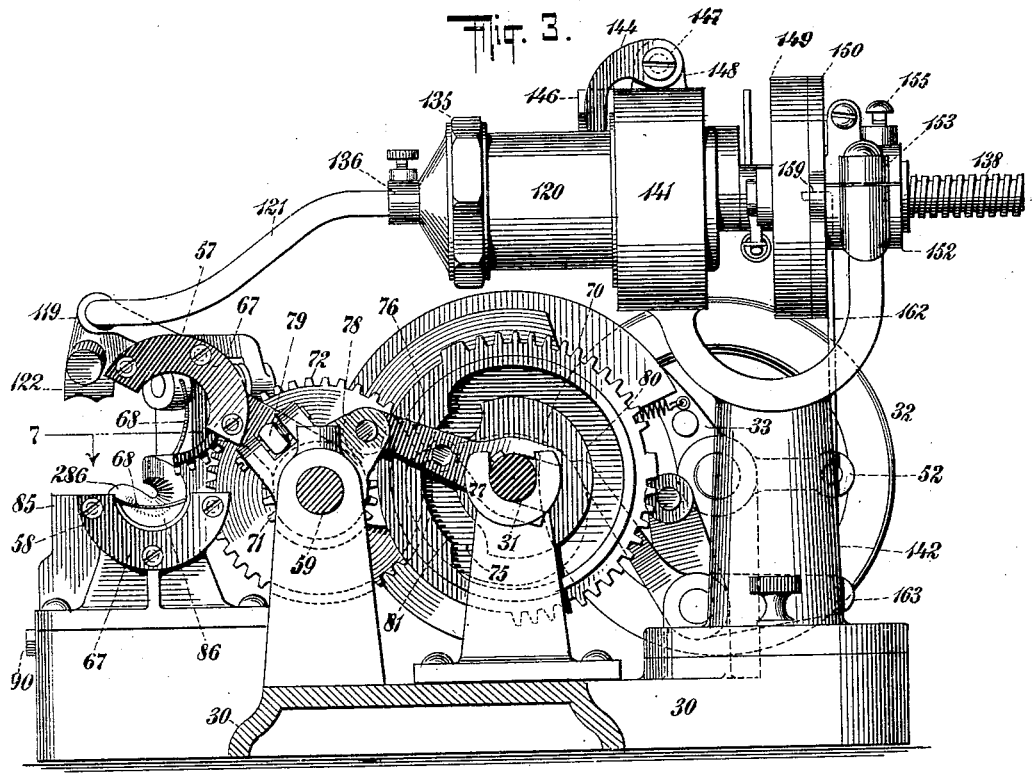
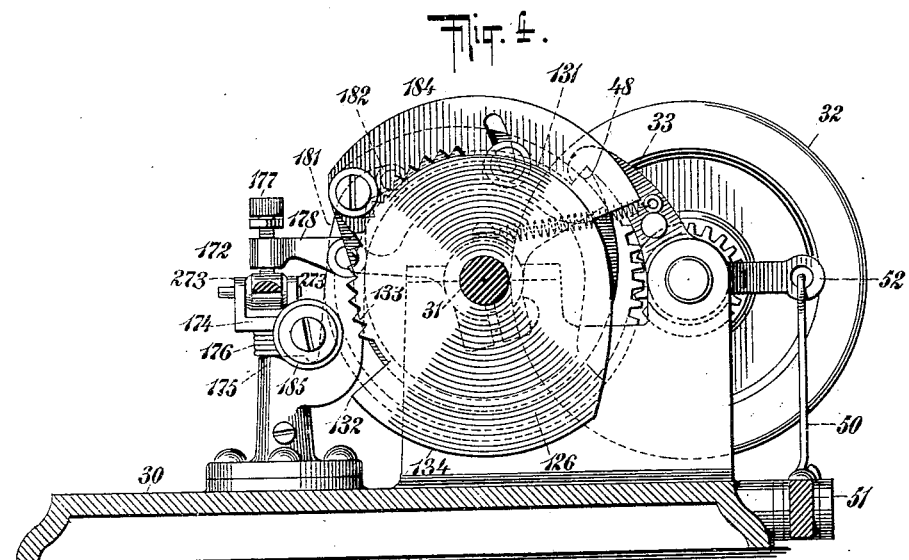
WITNESSES:
Gustav Dieterich
John Kehlenbeck
INVENTOR
John R. Williams
BY
Chas. C. Gill
ATTORNEY No. 664,918. Patented Jan. 1, 1901.
J. R. WILLIAMS.
CIGAR MAKING MACHINE.
(Application filed June 16, 1900.)
(No Model.) 8 Sheets—Sheet 4.
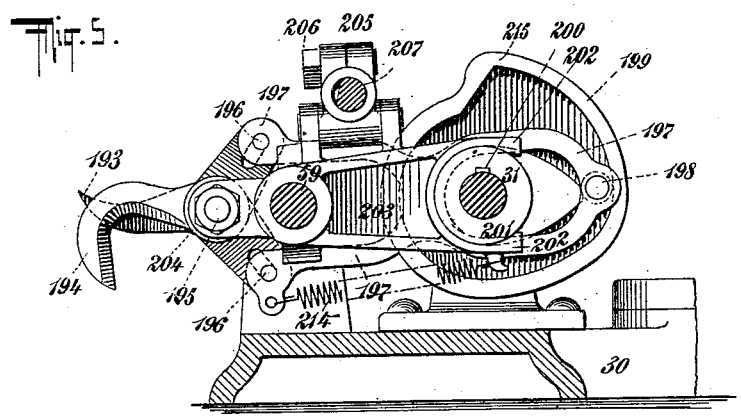
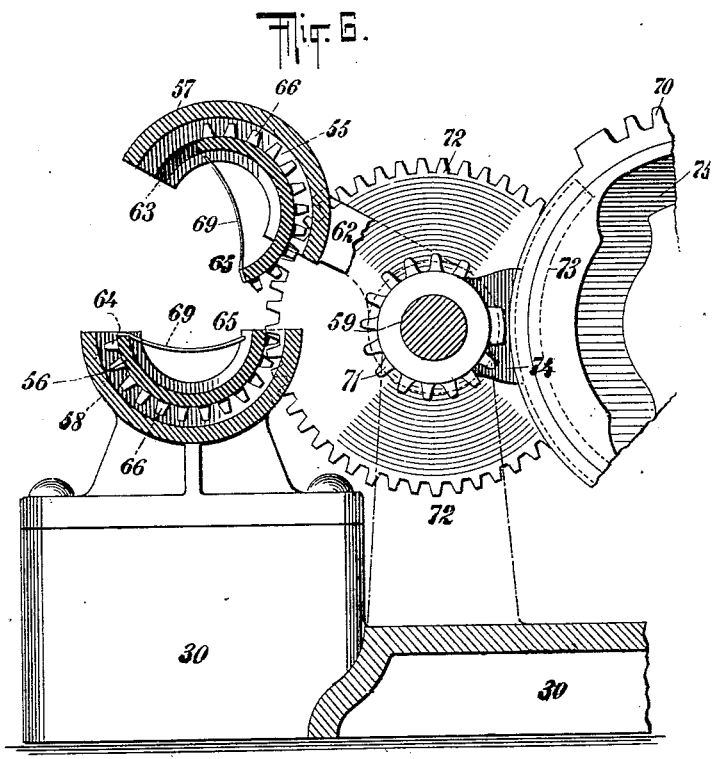

No. 664,918. Patented Jan. 1, 1901.
J. R. WILLIAMS.
CIGAR MAKING MACHINE.
(Application filed June 16, 1900.)
(No Model.) 8 Sheets—Sheet 5.
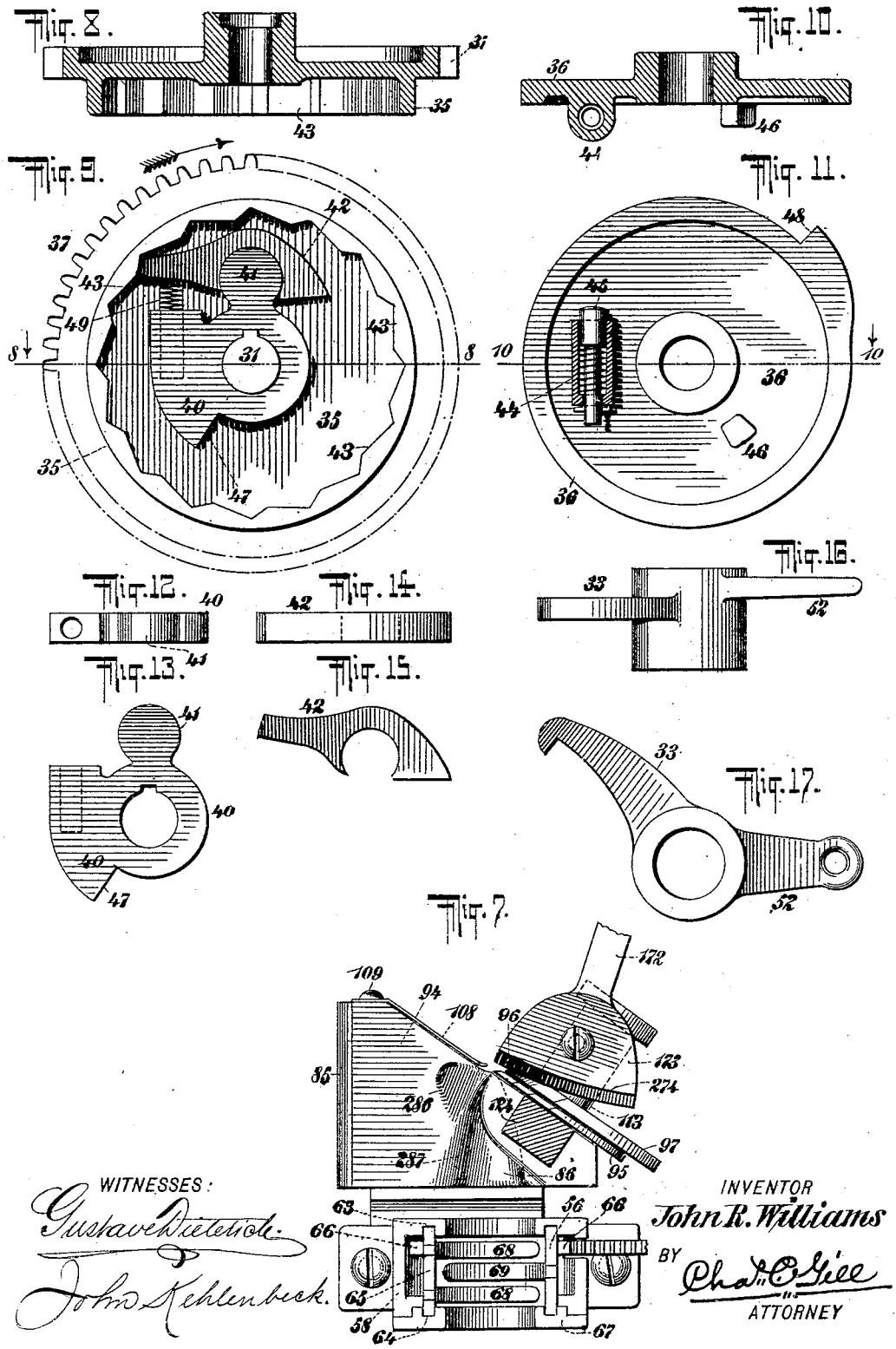

No. 664,918. Patented Jan. 1, 1901.
J. R. WILLIAMS.
CIGAR MAKING MACHINE.
(Application filed June 16, 1900.)
(No Model.) 8 Sheets—Sheet 6.
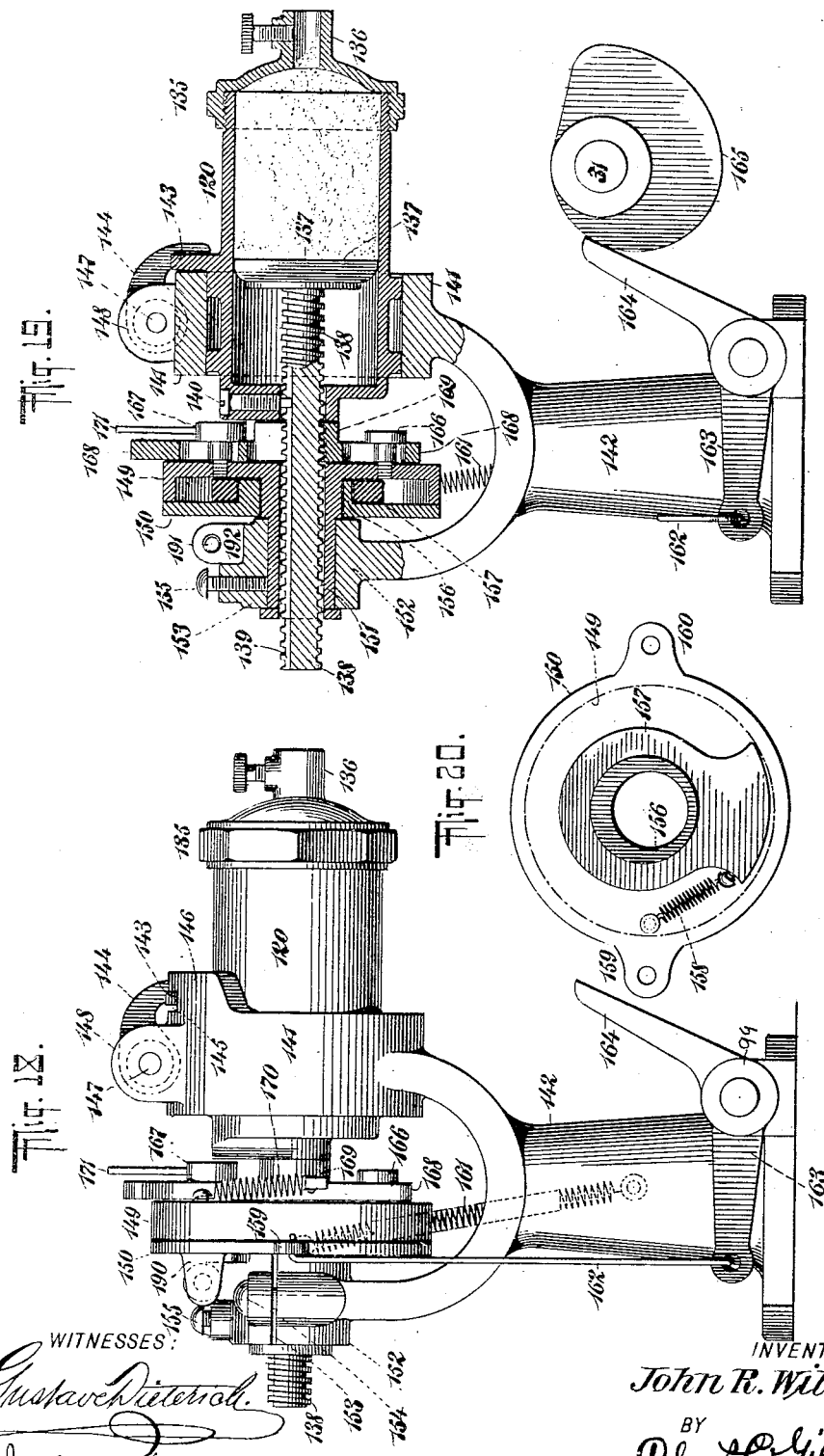
WITNESSES:
Gustave Dieterich
John Kehlenbeck
INVENTOR
John R. Williams
BY
Chas. O. Gill
ATTORNEY
THE NORRIS PETERS CO., PHOTO-LITHO., WASHINGTON, D. C.

No. 664,918. Patented Jan. 1, 1901.
J. R. WILLIAMS.
CIGAR MAKING MACHINE.
(Application filed June 16, 1900.)
(No Model.) 8 Sheets—Sheet 7.
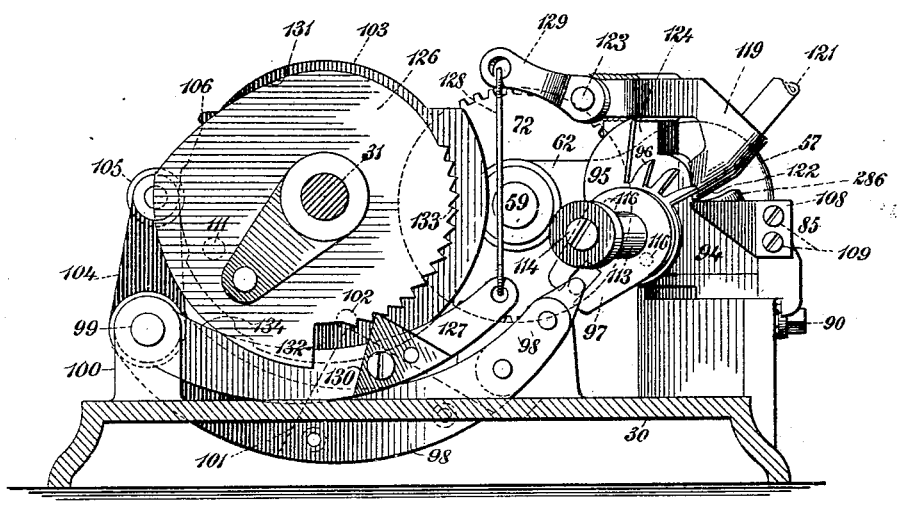
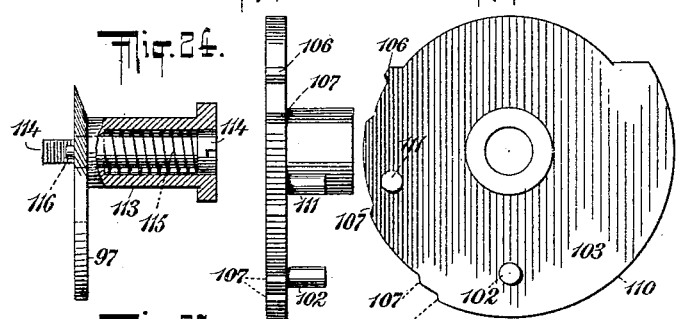
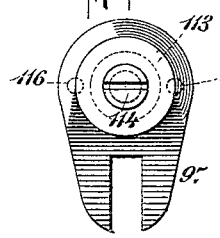
WITNESSES:
Gustave Dieterich
John Kehlenbeck
INVENTOR
John R. Williams
BY Chas. C. Gill,
ATTORNEY No. 664,918. Patented Jan. 1, 1901.
J. R. WILLIAMS.
CIGAR MAKING MACHINE.
(Application filed June 16, 1900.)

(No Model.) 8 Sheets—Sheet 8.

WITNESSES:
Gustave Dieterich
John Kehlenbeck

INVENTOR
John R. Williams
BY Chas. O. Gill
ATTORNEY

UNITED STATES PATENT OFFICE.

JOHN R. WILLIAMS, OF EAST ORANGE, NEW JERSEY, ASSIGNOR TO THE JOHN R. WILLIAMS COMPANY, OF NEW YORK, N. Y.

CIGAR-MAKING MACHINE.

SPECIFICATION forming part of Letters Patent No. 664,918, dated January 1, 1901.

Application filed June 16, 1900. Serial No. 20,494. (No model.)

*To all whom it may concern:*

Be it known that I, JOHN R. WILLIAMS, a citizen of the United States, and a resident of East Orange, in the county of Essex and State of New Jersey, have invented certain new and useful Improvements in Cigar-Making Machines, of which the following is a specification.

The invention relates to improvements in cigar-making machines, and particularly to machines for forming the head ends of cigars.

In accordance with my invention the cigar after having been wrapped and while the end of the wrapper is loose and projecting from the end of the cigar ready to be finally applied and the head of the cigar finished in the usual manner is introduced to the machine made the subject hereof and the said projecting end of the wrapper is by means of said machine and without the employment of hand-labor applied to the end of the cigar and the latter finished to completion.

I have termed the machine made the subject hereof a "cigar-heading" machine, since, as above indicated, the wrapper is applied by any of the usual methods to the body of the cigar, leaving the end of the wrapper loose at the head of the cigar, and the head of the cigar is then completed by said machine.

I have embodied my invention in the machine shown in the accompanying drawings, said machine comprising a rotatory frame having a clamp in which the cigar to be finished or headed is placed, a thimble having a cone-shaped recess to receive the head end of the cigar held by the said clamp, a knife or cutter for trimming the projecting end of the leaf at the head end of the cigar, pasting devices for properly applying an adhesive substance to the leaf in order to secure it permanently in place, means for trimming the tuck end of the cigar, means for removing the cigar from the said rotatory frame after the cigar has been completed, and operative mechanism for actuating the various parts hereinbefore referred to.

The object of the invention is to diminish the time, labor, and expense incident to finishing the heads of cigars and to produce a machine which will automatically and perfectly finish the cigars, the latter when ejected from the machine being ready for the market.

The invention will be fully understood from the detailed description hereinafter presented, reference being had to the accompanying drawings, in which—

Figure 1 is a top view of a machine constructed in accordance with and embodying the invention. Fig. 2 is a front view of same. Fig. 3 is a vertical transverse section of same on the dotted line 3 3 of Fig. 1. Fig. 4 is a like section of same on the dotted line 4 4 of Fig. 1. Fig. 5 is a like section of same on the dotted line 5 5 of Fig. 1 and shows the tuck-cutting knives in their closed position, together with mechanism for operating said knives. Fig. 6 is a like section of same on the dotted line 6 6 of Fig. 1 and shows the rotatory frame by which the cigar is held while being turned, with its head end in the thimble for completing said head end, said frame being shown in its open position ready to receive the cigar. Fig. 7 is a horizontal section through a portion of same on the dotted line 7 7 of Fig. 3. Fig. 8 is a central section on the dotted line 8 8 of Fig. 9 of one portion of the clutch on the main driving-shaft of the machine for permitting the automatic stoppage of the machine at the end of each revolution of the said shaft. Fig. 9 is an elevation looking at the inner side of same. Fig. 10 is a section corresponding with Fig. 8 of the other half of the clutch on the main driving-shaft of the machine, said section being on the dotted line 10 10 of Fig. 11. Fig. 11 is an elevation, partly in section, looking at the inner side of same. Figs. 12 and 13 respectively show the top and face of an inner portion of the aforesaid clutch and which portion carries the inner engaging dog. Figs. 14 and 15 are respectively detached top and face views of the inner engaging dog of the aforesaid clutch. Figs. 16 and 17 are respectively detached top and face views of a pivotally-mounted pawl which at the end of each revolution of the driving-shaft arrests one part of the aforesaid clutch and effects the stoppage of the machine. Fig. 18 is a detached side elevation of the paste-holding cylinder and coöperating parts. Fig. 19 is a central vertical longitudinal section of same. Fig. 20 is a detached elevation of the clutch forming a part of the pasting mechanism shown in Figs. 18 and 19. Fig. 21 is a vertical transverse section of the machine on the dotted line 21 21 of Fig. 1. Fig. 22 is an edge view of the cam-wheel for actuating the wrapper-trimming knife. Fig. 23 is a face view of same. Fig. 24 is a side elevation, partly in section, of the means for securing the wrapper-trimming knife in position. Fig. 25 is an end view of same looking at the right-hand end of Fig. 24. Fig. 26 is a detached edge view of the wrapper-trimming knife. Fig. 27 is a face view of same. Fig 28 is a detached front view, partly in section, of the thimble and means for clamping the thimble in position. Fig. 29 is a detached side elevation of the locking-pin, which is a part of the means for clamping the aforesaid thimble in position. Fig. 30 is a detached elevation of a clamp which coöperates with the pin shown in Fig. 29 in securing the thimble in position; and Figs. 31 to 44, inclusive, are detailed views of some of the cams and gears of the machine, said parts being hereinafter specifically referred to by reference-numerals.

In the drawings, 30 denotes the supporting bed or frame of the machine, 31 the main driving-shaft, and 32 the usual belt-wheel by which power may be applied to the shaft 31 and from said shaft to the operative parts of the machine. The shaft 31 is provided with clutch mechanism of any suitable character, which will automatically cut off the power of the belt-wheel 32 from the shaft 31 at the end of each rotation of the latter.

The machine will be provided with a pawl 33, Figs. 1, 4, 16, and 17, for automatically effecting the disengagement of the parts of the main clutch and the consequent stopping of the shaft 31 at the end of each rotation of said shaft, and upon the release of said pawl 33 from the clutch mechanism by the manual act of the operator said clutch mechanism will again communicate the motion of the belt-wheel 32 to the main driving-shaft 31. Several forms of clutch mechanism for stopping the shaft 31 at the end of each of its rotations and again starting the shaft 31 are well known in this art, and this invention is not limited to any special means for stopping or starting the shaft 31. In the drawings, however, I illustrate a specially desirable clutch mechanism, the details of which are presented in Figs. 8 to 15, inclusive, and the exterior of which is shown in Figs. 1 and 2, in which it will be observed that the clutch 34 is mounted on the end of the main driving-shaft 31 and comprises two main parts 35 36, the former of which is integral with a spur gear-wheel 37, which is in mesh with the pinion 38, connected with the belt-wheel 32, said belt-wheel and pinion being mounted on the stud or short axle 39, upon which is also freely mounted the pawl 33, hereinbefore mentioned. The main parts 35 36 of the clutch 34 are brought into face-to-face contact, as indicated in Fig. 1, and are normally free upon the shaft 31, while keyed upon said shaft and inclosed between said parts 35 and 36 is the block 40, having a bearing-head 41, upon which is mounted the dog 42, Figs. 9 to 15, inclusive, which has a socket to fit and turn on said head 41, and an end to lock with the serrated inner surface 43 of the rim of the clutch-section 35 when pressed and held outward against said surface, as shown in Fig. 9, by the spring 49, carried by said block 40. When the clutch-section 35 and dog 42 are in engagement with one another, as shown in Fig. 9, the motion of the belt-wheel 32 and pinion 38 will be communicated to the gear 37 and clutch-section 35 and be by said clutch-section 35 imparted through the dog 42 and block 40 to the driving-shaft 31, whereby said shaft will be rotated. The clutch-section 36, in connection with the pawl 33, is utilized to disengage at the proper time the dog 42 from the clutch-section 35, so that said section 35, while continuing to rotate, shall have no effect upon the block 40 and driving-shaft 31, and to this end the clutch-section 36 has on its inner face the stud 44, which lies in near relation to the shank end of the dog 42, and which when the clutch-section 36 is arrested by the pawl 33 will form an obstruction against which said shank end will press, with the result of turning the outer end of the dog 42 from the said surface 43 and allowing the clutch-section 35 to continue its rotation without imparting its movement to the driving-shaft 31. The stud 44 of the clutch-section 36 preferably contains a yielding spring-plunger 45 for contact with the shank end of the dog 42, and said clutch-section 36 is formed with the inner stud 46, which lies close to the angular edge 47 of the block 40 and serves to assure the correct relation of the stud 44 to the dog 42. The engaging end of the pawl 33 rides on the edge of the clutch-section 36, and at the end of each revolution of the main driving-shaft 31 said end of said pawl hooks upon the shoulder 48 on said edge and holds the said section 36 stationary, with the result above described, of cutting off the power from, and thus arresting the shaft 31. The pawl 33 will hold the clutch-section 36 stationary, and thereby keep the power from the shaft 31 until the pawl 33 is either manually or by suitable means lifted from the shoulder 48 of the clutch-section 36, upon which being done the spring 49 will again force the dog 42 into engagement with the serrated surface 43 of the clutch-section 35 and power will be again imparted to the shaft 31, the latter then continuing to revolve until the pawl 33 again meets the shoulder 48 and arrests the clutch-section 36. The pawl 33 will be controlled by any suitable means; but in the present instance it is connected by a link 50, Fig. 4, with a pivoted lever 51, Fig. 1, which is heavier at its right-hand end and keeps the hooked end of said pawl in contact with the edge of the clutch-section 36, with the result that at each revolution of the said section 36 the pawl 33 will engage the shoulder 48 and cut off the power of the belt-wheel 32 from the driving-shaft 31. When the pawl 33 is to be freed from the clutch-section 36, so as to permit the power of the belt-wheel 32 to again reach the shaft 31, the said pawl 33 may be lifted by hand from the said section 36 for a moment to permit the said section to start to rotate, or the same result may be accomplished by pressing upward on the right-hand end of the lever 51, and thereby causing the left-hand end of said lever to pull downward on the arm 52 of said pawl 33 and temporarily lifting the engaging end of said pawl from the shoulder 48 of the clutch-section 36.

*Rotary frame and cigar-clamp.*—The cigar is held at its body portion during the completion of the head end of the cigar by a clamp forming part of a rotatory frame, which frame in the present instance is in the form of a divided gear-wheel, as more clearly illustrated in Fig. 6, in which the two halves of the gear-wheel are numbered 55 56, mounted, when together, to revolve within the clamp-casing, composed of the upper and lower sections 57 58, respectively, the latter being rigidly mounted upon the bed-frame 30 and the upper half 57 being in the form of a cap and adapted to be raised from and lowered upon the lower half 58 and being pivotally mounted upon the rigid shaft 59, extending longitudinally of the machine and secured in suitable standards 60 and 61. The upper half or cap 57 of the clamp-casing is carried by arms 62 62, Fig. 1, which are pivotally mounted upon the shaft 59, the latter acting as a pivotal bearing for said arms 62 and said cap 57. The upper and lower halves 57 and 58 of the clamp-casing constitute a circular frame, within which the rotatory cigar-clamp frame (represented by the sections 55 and 56) of the gear-wheel may freely revolve while holding the cigar, and the said sections 57 58 are grooved at opposite edges, as at 63 64, Figs. 6 and 7, to receive the flange edges of the said cigar-clamp, which for convenience I will designate in its entirety by the numeral 65. In Fig. 7 I designate the teeth of the frame 65 by the numeral 66, and these teeth 66 when the two sections 55 and 56 are together extend entirely around the cigar-clamping frame 65 and form the means by which motion is communicated to the frame 65 and the latter, with the cigar clamped therein, caused to perform a rapid rotation. At one side the upper and lower sections 57 58 of the clamp-casing are provided with the face-plates 67, which are fastened to the said sections 57 58 by means of screws, as shown more clearly in Fig. 3, and which when removed permit of the introduction or withdrawal of the sections 55 56 of the rotatory frame 65 into or from the sections 57 58 of the casing for the clamping-frame 65. The grooves 63 for one edge of the rotatory frame 65 are formed in the body of the sections 57 and 58, while the groove 64 for the other edge of the rotatory frame 65 are formed in the face-plates 67, as shown in Fig. 7, and said grooves 63 and 64 form annular runways which correspond with one another and within which the rotatory frame 65 may perform its rotary motion. Within the sections 55 and 56 of the rotatory frame 65 is preferably provided some yielding means for clamping against the body of the cigar when the upper half or cap 57 of the clamp-casing is closed upon the lower section or half 58 of said casing, and to this end I provide within the facing portions of each of the said sections 55 and 56 the light yielding leaf-springs 68 and 69, the spring 69 being intermediate the springs 68 and being secured to one edge of the section 56, as shown in Fig. 7, while the springs 68 are secured to the opposite edge of said section 56. In this arrangement of the springs 68 and 69 the springs may readily yield at their central parts and exert correct pressure centrally upon the cigar. The springs for the upper section 55 of the clamping-frame 65 correspond exactly with the springs shown in Fig. 7 as secured to the lower half or section 56 of said clamping-frame, and said springs when said section 55 is closed downward upon the section 56 firmly bind the body of the cigar within the clamping-frame 65 without injury to the cigar-wrapper. The frame 65 is thus a rotatory frame. It receives the body of the cigar to be headed when it (said frame) is in its open position, (shown in Fig. 6,) and it binds upon the body of the cigar when its upper section 55 is closed downward upon its lower section 56, the springs 68 and 69 serving to firmly but yieldingly bind against the cigar. The upper and lower sections 57 58 of the clamp-casing remain stationary while the clamping-frame 65 is rotating with the cigar, and then the upper section or cap 57 of said clamp-casing is elevated, as shown in Fig. 6, to permit of the removal of the finished cigar from said clamping-frame 65.

Figure 39:
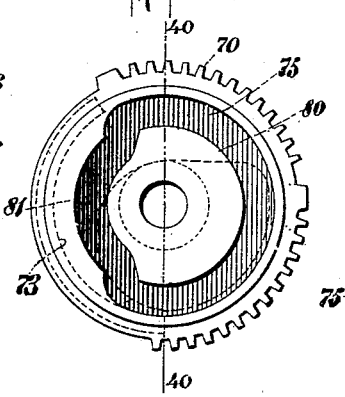
Figure 40:
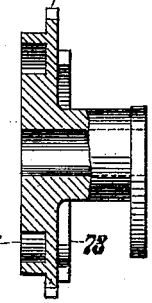
Figure 35:
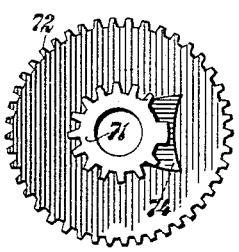
Figure 36:
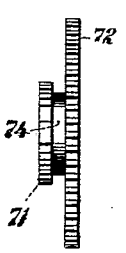
Figure 41:
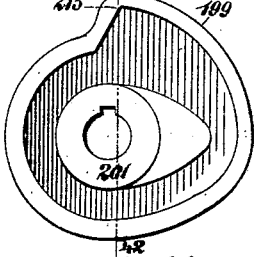
Figure 42:
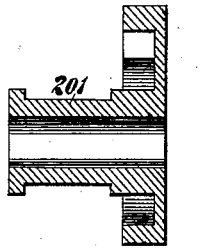
Figure 43:
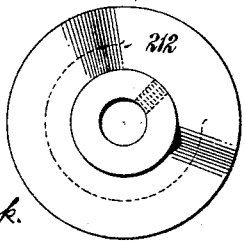
Figure 44:

The clamping-frame 65 receives its motion from the main driving-shaft 31 through the gear-wheel 70, Figs. 39 and 40, on said shaft, Figs. 1, 3, and 6, the pinion-wheel 71 to mesh with said gear-wheel 70 and loosely mounted on the shaft 59, and the gear-wheel 72, which is in one piece with said pinion-wheel 71, Figs. 35 and 36, and in direct engagement at all times with the gear-teeth 66 of both sections 55 and 56 of the cigar-clamping frame 65. The gear-wheel 72 thus receives its motion from the main driving-shaft 31 and directly effects the rotation of the clamping-frame 65, the latter during the rotation of the said gear-wheel 72 holding the cigar and causing the cigar to rotate with it.

It is desirable that the cigar-clamping frame 65 shall cease to rotate before the driving-shaft 31 completes its revolution, and hence means are provided for locking the gear-wheel 72 against movement during the latter part of the rotation of the driving-shaft 31, and these means consist in omitting a part of the teeth from the gear-wheel 70 and in providing upon one edge of the said gear-wheel 70 a flange 73 for engagement with the locking-dog 74, Fig. 6, which is rigid with the pinion-wheel 71 and gear-wheel 72. The pinion-wheel 71 will rotate so long as the teeth of the gear-wheel 70 are moving against the same; but it is desirable that after the teeth of the gear-wheel 70 leave the teeth of the pinion-wheel 71 the said pinion-wheel, with its gear-wheel 72, shall be absolutely locked against all motion during the continuance of the motion of the driving-shaft 31 and gear-wheel 70, and to secure this locking of the pinion-wheel 71 and its parts the dog 74 engages the flange 73, as shown in Fig. 6, and remains in such engagement during all of the time that the gear-wheel 70 is in motion after its teeth have left the pinion-wheel 71. The length of time the dog 74 shall remain in engagement with the flange 73 is governed entirely by the length of the latter, and hence the flange 73 will be of such length as to pass from contact with the dog 74 at the time the teeth of the gear-wheel 70 are to again engage the pinion-wheel 71. The gear-wheel 70 thus transmits the power from the driving-shaft 31 for rotating the cigar-clamp 65, and may continue to revolve with said driving-shaft 31 without affecting the cigar-clamp 65 during the latter part of the motion of said driving-shaft 31. The gear-wheel 70 performs one rotation with the driving-shaft 31 and then comes to a stop with said shaft; but the cigar-clamping frame 65 comes to a stop prior to the stoppage of the gear-wheel 70 and driving-shaft 31 in order that after the wrapper has been applied upon the head end of the cigar the tuck end of the latter may be trimmed, the cigar-clamping frame opened, and the cigar removed before the power-shaft 31 comes to a stop and after the clamping-frame 65 has become arrested. The relative proportions of the pinion-wheel 71, the gear-wheel 70, and gear-wheel 72 are such that the cigar-clamping frame 65 will have a rapid rotation and will perform about four revolutions before coming to a stop during the one rotation of the main driving-shaft 31, the cigar being thus given a rather rapid rotation for the purpose of finishing, in the manner hereinafter described, the head end of the same.

The means for raising and lowering the upper section or cap 57 of the clamp-casing are clearly shown in Figs. 3, 6, and 39, and consist of the cam 75, formed in one face of the gear-wheel 70, the pitman-rod 76, Fig. 3, carrying a roller 77 in contact with said cam 75, and the bell-crank lever 78, adapted to rock on the shaft 59 and having its forward arm bifurcated to receive the stud 79, Figs. 1, 2, and 3, extending laterally outward from the arm 62, carrying the said cap or upper section 57 of the said clamp-casing. The rotation of the gear-wheel 70 and its cam 75 effects through the pitman-rod 76 not only the opening and closing of the upper section or cap 57 of the clamp-casing, but also locks said cap or upper section 57 in its closed position during all such time as the cigar is within the cigar-clamping frame 65. While the roller 77, carried by the pitman-rod 76, is traveling against the smooth regular surfaces 80, Figs. 3 and 39, of the cam 75, the said rod 76 is then at its extreme forward position and there securely held, with the result of maintaining the upper cap or section 57 in its lower or closed position. When the shoulder portion 81 of the cam 75 reaches the roller 77, carried by the pitman-rod 76, the latter will be pulled rearward thereby, with the result of elevating the upper section or cap 57, which cap 57 will be held in its open position by the said portion 81 of the cam 75 so long as said portion 81 is in contact with the roller 77. When during the rotation of the gear-wheel 70 and cam 75 the portion 81 of the cam 75 reaches the roller 77 of the pitman-rod 76, the upper section or cap 57 will not only be opened, but will remain open until the main driving-shaft 31 has not only come to a stop, but has started to make another revolution during the operation of heading a subsequent cigar. The projecting portion 81 of the cam 75 is of such length that it is enabled to hold the upper section or cap 57 open during all of the closing movement of the driving-shaft 31, and this is of advantage, since when the machine comes to a rest the cigar-clamping frame 65 is in a normal open condition preparatory to receiving a cigar-body.

It will be observed on reference to Fig. 6 that the teeth of the gear-wheel 72 engage the teeth of both sections of the clamping-frame 65, the center of said gear-wheel 72 being substantially on a line with the center of said clamping-frame, and in view of this arrangement the upper section 55 of said clamping-frame may roll upward and downward upon said gear-wheel 72 during the opening and closing of the upper section or cap 57 of the clamp-casing. When the upper section or cap 57 of the clamp-casing is lowered from the position in which it is shown in Fig. 6, the said section 55 will have a slight turning motion within the said section or cap 57, so that upon the upper section 55 reaching the lower section 56 the clamp 65 will form a complete cylinder, with the gear-teeth 66 extending entirely around the same.

*The thimble and its coöperating parts.*—The means for giving to the cigar its rotary motion, by which the loose portion of the wrapper at the head end of the cigar is caused, by the coöperation of other devices hereinafter described, to be wrapped around said end, having been described, I will proceed to a description of the thimble 85 and the parts connected and coöperating therewith, by which the loose portion of the wrapper at the head end of the cigar is controlled, trimmed, and caused to be directly and properly wrapped upon and secured to the cigar.

The thimble 85 is preferably of metal and contains a substantially conical recess 86 to receive the head end of the cigar, while the body of the cigar is supported or held by the cigar-clamping frame 65, and said thimble 85 is adjacent to the cigar-clamping frame 65 and has its recess 86 in line with the center of said clamping-frame 65. The thimble 85 is detachably secured upon the bed plate or frame 30, and at its lower side is formed with the T-shaped groove 87, Figs. 2 and 28, to pass upon the head 88 of a pin 89, Fig. 30, which seats within a vertical socket in the bed-plate 30 and receives the middle eccentric portion of a horizontal pin 90, which has an exposed head to receive a wrench and has its eccentric portion within an aperture in said pin 89, while its ends journal in a bearing-aperture in said bed 30. The purpose of the pin 89 and eccentric pin 90 is to secure the thimble 85 securely in place and at the same time to permit of the convenient detachment of the thimble 85 when necessary. When the pin 90 is by means of a wrench turned in a direction to throw its eccentric portion downward against the pin 89, the latter will bind the thimble 85 in position, and when the pin 90 is turned to relieve the pressure of its eccentric portion from the pin 89 the latter will be loosened with respect to the thimble 85, and the latter may then be moved frontward from off the head 88 of said pin 89. The pin 89 contains a hole through which the pin 90 passes, and thus the pin 90 prevents the pin 89 from losing its position even when the thimble 85 is removed. The pin 90 may be withdrawn forward from its aperture or socket, and thus leave the pin 89 free to be entirely elevated by hand, and in the assembling of the parts the pin 89 is first introduced into its socket, and then the pin 90 is inserted into its socket and passes through the hole in the pin 89, locking the latter in position, but leaving the same free to be raised and lowered to a limited extent by the eccentricity of the middle portion of the pin 90.

The thimble 85 has upon its front portion or table and adjacent to the apex or smaller end of the recess 86 the elevation 286, inclining inward and downward to said recess, and said thimble along the outer edge of said recess and extending toward the larger end of said recess is beveled off, as at 287, Fig. 7, to substantially follow in a longitudinal direction the incline of said elevated portion 286. The thimble is given the elevation 286 and the beveled outline 287, so as to aid the loose portion of the cigar-wrapper to enter said recess and become drawn around the head end of the cigar in a manner which will insure the perfect success of the operation. The elevated portion 286, located adjacent to the apex of the recess 86, is of special importance in that by the elevation and inclination of the extreme outer portion of the loose wrapper the latter may be safely carried into said recess at the point of the cigar and be compelled to evenly and nicely wind upon said end without creating any malformation at the extreme point of the cigar.

The thimble 85 has its recess 86 when the cigar is within said recess partly closed at its outer exposed side by the lower contracted end 122 of the paste-nozzle 119, hereinafter fully referred to. At this point I desire simply to have it understood that when the lower contracted portion 122 of the paste-nozzle 119 is in its lower position, Fig. 21, partly closing said recess 86, it is above and clear of the aforesaid elevation 286 and beveled portion 287, a space being left between the said nozzle and the said elevation 286 and beveled portion 287 for admitting the inward passage of the cigar-wrapper to the head of the cigar.

The thimble 85 is employed in conjunction with means for applying the paste upon the cigar-wrapper, a knife for trimming off that portion of the wrapper which may overhang or extend beyond the outer side of the thimble, means for lightly hammering the wrapper as it is drawn around the cigar, and means for controlling and turning downward the overhanging portion of the wrapper beyond the thimble, and these several operative parts, with the means for actuating the same, will now be described.

*The wrapper-trimming knife.*—The knife for trimming off the surplus portion of the wrapper overhanging the outer angular side 94 of the thimble 85 is numbered 95 and is formed with the several blades 96, Fig. 27, the upper one of which is larger than the lower ones and is adapted at the proper time to make the final cut against the overhanging portion of the wrapper. The knife 95 is pivotally mounted upon the inner portion of the angular side 94 of the thimble 85 and in use is connected with a bifurcated shank 97, Figs. 1, 21, and 25, which receives the forward bent end of the arm 98, hung from the pin 99, mounted in suitable bearings 100 at the rear portion of the bed-plate 30. The arm 98 curves downward below the main driving-shaft 31 and has below said shaft an upwardly-extending section 101 of inverted-V shape (dotted in Fig. 21) in position to be met by the pins 102 and 111, carried by the cam-wheel 103, Figs. 21 and 23, on said driving-shaft 31, and also has the rear extension 104, carrying a roller 105, which at the proper time will be acted upon by the periphery of the cam-wheel 103 for the purpose of rocking the lever-arm 98 and through the latter thereby effecting the proper motion of the knife 95 to accomplish the trimming of the wrapper which may at the time be overhanging the angular side 94 of the thimble 85. During the first part of the rotation of the main driving-shaft 31 (and this shaft is not allowed to rotate until the cigar has been placed upon the lower section of the clamp 65, with the head end of the cigar within the recess 86 of the thimble 85) the cam 103 performs no function; but soon thereafter the pin 102 of the cam 103 is carried against the portion 101 of the lever-arm 98, and it presses the front portion of said arm 98 downward, and thereby by acting on the shank 97 of the knife 95 causes the cutters 96 of the latter to be fully elevated to their upward position. The continued rotation of the cam 103 then causes the projections 106 and 107 on the edge of the cam 103 to successively come against the roller 105, carried by the upwardly-extending rear portion 104 of the said lever-arm 98, said projections 106 and 107 operating to move said portion 104 of the lever-arm rearward and causing the front portion of said arm to move upward, and thereby turn the front portion or cutters 96 of the knife 95 downward against the overhanging portion of the cigar-wrapper. The projection 106 of the cam 103 is somewhat more prominent than the projections 107 and has a pointed outer end, and this projection 106 performs a distinct function in itself, in that it, owing to its form, quickly presses the upper portion 104 of the lever-arm 98 outward and then allows it to immediately return frontward, this having the effect of, through the lever-arm 98, causing the lower blade or cutter 96 of the knife 95 to cut downward into and through the rear edge of the overhanging portion of the cigar-wrapper and then immediately elevate. Thus the cigar-wrapper is given a preliminary cut at its then rear portion with respect to the front of the thimble 85, and is thereby prevented during the preliminary operation of the machine from gathering into too great a thickness at the extreme end of the cigar. The preliminary cut, which is formed by the knife 95 during the passage of the projection 106 of the cam 103 against the roller 105, carried by the lever-arm 98, is followed by the contact of the projections 107 against the said roller 105, and this contact of the said projections 107 with the roller 105 has the effect of causing the knife 95, by successive thrusts, to cut down through the overhanging portion of the cigar-wrapper, the upper blade or cutter 96 making the final cut and completely severing any portion of the wrapper which may be left overhanging the angular side 94 of the thimble 85. The cutters or blades 96 of the knife 95 move between a steel strip 108 and the angular side 94 of the lever 85, the said strip 108 being fastened by screws 109, Fig. 21, upon the end of the thimble 85. The cam 103 has a smooth regular surface following the projections 107, and this smooth regular surface (numbered 110, Fig. 23) moves against the roller 105 of the lever-arm 98 after the upper cutter or blade 96 has fully descended in order that for a given length of time the knife 95 may remain in its then lower position and effectually close any opening which may be left at the pointed end of the recess 86 in the thimble 85. The regular surface 110 of the cam 103 runs off of the roller 105 of the lever 98 at about the time the cigar-clamping frame 65 commences to open, and the paste-nozzle 119, hereinafter described, starts to elevate from the thimble 85, and at about this time the pin 111 on the cam 103 will move against the section 101 of the lever 98 and depress the front portion of said lever for the purpose of at once turning the knife 95 to its upward position, this occurring just prior to the driving-shaft 31 reaching the end of its revolution. When the driving-shaft 31 does reach the end of its revolution, the knife 95 is thus left in its upper position preparatory for use in the subsequent operation of the machine. The knife 95 is thus in its upper position in the normal at-rest condition of the machine or before the driving-shaft 31 commences to rotate, having been restored to its upper position by the passage of the pin 111 of the cam 103 against the section 101 of the lever-arm 98, the function of the pin 111 of the cam 103 being thus to restore the knife 95 to its upper normal position. Upon the shaft 31 and cam 103 starting to make their revolution the projection or toe 106 of the cam 103 presses against the roller 105 of the lever 98, as above described, and causes the lower cutter or blade 96 to make the preliminary cut above referred to in the overhanging portion of the cigar-wrapper, and the moment this cut has been made the pin 102 on the cam 103 contacts with the section 101 of the lever 98 and by depressing the lever slightly restores the knife 95 to its upper position, the contact of said pin 102 with said section 101 of the lever 98 causing the roller 105 to ride down the then lower inclined side of the aforesaid toe or projection 106 of the cam 103, and the pin 102 thus having no function further than to compel the roller 105, after the preliminary cut in the wrapper has been made, to follow down the then lower surface of said toe or projection 106 in order that thereby the lever-arm 98 may immediately restore the knife 95 to its upper position, preparatory to being acted upon by the succeeding projections 107 on said cam 103.

I have described the knife 95 as being connected with a shank 97, bifurcated to be engaged by the bent front end of the lever-arm 98. The shank 97 referred to is integral with the sleeve 113, which is fastened to the thimble 85 by means of a screw 114, Fig. 21, the latter passing within the spring 115, inclosed in said sleeve 113, as shown in Fig. 24. The shank 97 carries on its inner face two pins 116, which enter two apertures 117, Fig. 27, in the knife 95, the latter between said apertures 117 being slotted, as at 118, to pass over the inner end of the screw 114. The shank 97 and sleeve 113 are first secured to the thimble 85, and then the knife 95 is introduced to place by pulling outward on the head of the sleeve 113, so that the latter will move outward on the screw 114 against the stress of the spring 115 a sufficient distance to enable the knife 95 to be slipped between the shank 97 and the thimble 85, this insertion of the knife 95 between the shank 97 and the thimble 85 being for the purpose of enabling the pins 116, carried by the shank 97, and the apertures 117 in the knife 95 to come into alinement with one another, so that upon the release of the sleeve 113 the latter, by reason of the spring 115, may move inward against the knife 95 and cause the pins 116 to enter the apertures 117. The apertures 117 closely fit upon the pins 116, and hence when the latter are in said apertures they will hold the knife 95 and shank 97 in rigid relation to one another, and under such condition any movement imparted to the shank 97 by means of the lever-arm 98 will be communicated to the knife 95. The means provided for connecting the shank 97 with the knife 95 are important in that they permit of the ready removal of the knife 95 from the machine without disturbing any of the other parts of the machine, it being obvious that when it is desired to withdraw the knife 95 from the thimble 85 it is only necessary to pull outward on the head of the sleeve 113 sufficiently for the pins 116 on the shank 97 to be withdrawn from the apertures 117 in the knife 95, the latter being then free to be withdrawn. The reinsertion of the knife 95 in position is also very convenient of performance, since upon pulling the sleeve 113 slightly outward the knife 95 may be again inserted between the shank 97 and the thimble 85 until the pins 116 again meet the apertures 117. The screw 114, by which the sleeve 113 is secured to the thimble 85, has a bore slightly greater in diameter than the head of the screw, and the spring 115 is confined between the shank 97 and the head of said screw 114, and thus the sleeve 113 may be pulled outward upon the screw 114 to such extent as may be permitted by the body of the spring 115 when compressed. The sleeve 113, with its coöperating parts just above described, thus furnishes a very convenient means for attaching and permitting the detachment of the knife 95 and for connecting the shank 97 with said knife, so that the movement imparted to the shank 97 by means of the lever-arm 98 may be communicated to the knife 95. I have now described the trimming-knife 95, with the means for operating the same, the said means being the cam 103 on the driving-shaft 31 and the lever-arm 98, with which said cam during its rotation coöperates in effecting the proper movements of the said knife 95.

*Paste-nozzle and hammer.*—The means for applying the paste upon the cigar-wrapper at the thimble 85 is a hinged nozzle 119, to which the paste is supplied from the cylindrical reservoir, (shown in detail in Figs. 18 and 19,) which will be hereinafter fully described. The cylindrical paste-reservoir is numbered 120 and is connected with the nozzle 119 by means of a flexible tube 121, through which the paste in limited quantities is expressed and caused to issue through the lower contracted end 122 of the nozzle 119 to and upon the cigar-wrapper. The nozzle 119 is mounted upon the pin 123, which is secured in the upper end of a standard 124, rising upward from the main body of the thimble 85, the said standard 124 serving simply to support the hinged nozzle 119 at a suitable elevation. Upon the pin 123, upon which the nozzle 119 is mounted, is applied the coiled spring 125, Figs. 1 and 2, which exerts a normal tension to turn the nozzle downward toward the thimble 85, so that the lower end 122 of said nozzle may close a portion of the recess 86 in said thimble and reach the cigar-wrapper at the head end of the cigar. The nozzle 119 is by means of the spring 125 normally pressed downward, and the said spring is controlled and the movement of said nozzle 119 is regulated by means of a cam 126, Figs. 1, 21, 33, and 34, which is mounted upon the driving-shaft 31 and coöperates with the lever-arm 127, hung from the pin or shaft 99 at the rear side of the machine, the said arm 127 extending frontward below the driving-shaft 31 and being connected by a link 128, Fig. 21, with an arm 129, which extends rearward and normally slightly downward from the nozzle 119. The lever-arm 127 has a projection 130, Fig. 21, which is directly below the periphery of the cam 126 and is acted upon by the irregularities of the said periphery. The spring 125, which normally tends to turn the paste-nozzle 119 downward, also has the effect of pulling upward on the link 128, and thereby keeping the projection 130 of the lever-arm 127 close against the periphery of the cam 126, whereby all irregularities in the said periphery of said cam are enabled to act upon the said lever-arm 127 and the paste-nozzle 119, connected therewith. When the parts of the machine are in their normal at-rest condition, the paste-nozzle 119 will be in its upper position and the smooth surface 134 of the cam 126 will be upon the projection 130 of the lever-arm 127, and upon the starting of the machine in motion the smooth surface 134 of the cam 126 will at the point 132 pass from off the said projection 130, and the said projection will under the action of the spring 125 pass inward to the smaller diameter of the cam 126, adjacent to the said point 132, this permitting the spring 125 to close the nozzle 119 downward to the thimble 85, as shown in Fig. 21. The continued rotation of the driving-shaft 31 and cam 126 will then cause the toothed surface 133 of said cam to pass over the projection 130 of the lever-arm 127, with the effect of causing a vibratory motion in said lever-arm 127 and the communication of said vibratory motion through the link 128 to the paste-nozzle 119, thereby causing the lower contracted end 122 of the said paste-nozzle to rapidly hammer the tobacco wrapper as it is drawn around the head end of the cigar then in the thimble 85. The hammering of the wrapper at the head end of the cigar materially aids in imparting a uniform finish to the cigar and the prevention of any bulging of the wrapper thereon. When the nozzle 119 is in its lower position, the paste is expressed from the same in limited quantities. While the toothed portion 133 of the cam 126 is passing over the projection 130 of the lever-arm 127 the hammering action on the contracted end 122 of the paste-nozzle 119 will continue, and after the said toothed portion 133 of said cam 126 leaves the projection 130 the smooth regular surface 131 of the cam 127 will ride against the said projection 130 and retain the lever-arm 127 stationary, with the paste-nozzle 119 in its lower position, said paste-nozzle 119 thus remaining stationary during the latter part of the rotation of the cigar in the thimble 85. After the cigar has been rotated sufficiently for the completion of its head end the projecting portion 134 of said cam 126 will pass against the projection 130 of the lever-arm 127 and drive said lever-arm downward, and thereby through the link 128 effect the elevation of the paste-nozzle 119 to its normal position free of the thimble 85. The forcing downward of the lever-arm 127 by the projecting portion 134 of the cam 126 overcomes the stress of the spring 125 and permits the link 128 by pulling downward on the arm 129 to elevate the lower projecting portion 122 of the nozzle 119 from the thimble 85. When the portion 122 of the nozzle 119 is in its lower position, it substantially closes the outer end of the recess 86 of the thimble 85, and when the said portion 122 of the paste-nozzle is in its upper position it leaves the recess 86 fully exposed to admit of the introduction therein of the head end of the cigar.

It has been described before that the paste is expressed through the contracted portion 122 of the paste-nozzle 119 when said portion 122 is at its lower position, and it is obvious that when the nozzle 119 has been turned to its upper position the paste should not be caused to pass through the same. The paste is therefore supplied to the nozzle 119 by an intermittent action and only at a time when the nozzle 119 is in its lower position.

*The paste-reservoir and its coöperating parts.*—The action of the nozzle 119 for supplying paste to the wrapper at the head end of the cigar and for hammering the wrapper at said end of the cigar having been described, it is appropriate that the means for feeding the paste to said nozzle 119 be here described.

The paste in bulk is supplied to the cylindrical reservoir 120 and is expressed from the same through the tube 121 to the nozzle 119, said paste passing through the latter to the cigar-wrapper. The details of the paste-reservoir 120 and its coöperating parts are more clearly illustrated in Figs. 18 to 20, inclusive. The cylindrical reservoir 120 has upon its forward end, through which it is filled, the screw-cap 135, which terminates in a contracted spout 136, which receives one end of the flexible paste-tube 121. The rear end of the cylinder 120 is closed, as shown in Fig. 19, and within the cylinder 120 is provided a suitable piston 137, connected with a threaded piston-rod 138, the latter extending through the rear end of said cylinder 120 and having along one side a continuous groove 139, into which the point of a screw 140 passes, said screw serving to prevent the piston-rod 138 from having any rotation without interfering with said rod having imparted to it a direct longitudinal motion. The screw 140 passes through a thickened portion of the metal at the rear end of the cylinder 120, and said cylinder is rigidly, though detachably, mounted within the sleeve 141, cast upon the upper end of the standard 142, which is fastened by screws or otherwise upon the bed-plate 30. The cylinder 120 is locked in position within the sleeve 141 by means of an arm 143, carried by the cylinder, and a hinged catch 144, which turns downward against the outer side of the said arm 143 after the latter by an axial motion of the cylinder 120 has been turned into the recess 145, formed in the lug 146 of the sleeve 141. The hinged catch 144 is secured by a screw 147 to the side of the lug 148, cast on the upper side of the aforesaid sleeve 141. When the hinged catch 144 is turned upward, the cylinder 120 by an axial motion to the right will carry its arm 143 from the recess 145, and then if the piston-rod 138 has been freed the said cylinder 120 may be drawn directly outward from the sleeve 141, so as to be refilled with paste upon the removal of the screw-cap 135.

Surrounding the rear portion of the piston-rod 138 I provide a clutch mechanism for imparting to said rod an intermittent direct forward motion, so as to move the piston 137 against the paste contained in the front portion of the cylindrical reservoir 120, and this clutch mechanism comprises the wheel 149 and plate 150, said wheel 149 having the cylindrical hub 151, which is mounted in the bearing 152 on the upper end of the cast standard 142, being held therein by the cap 153, which is fastened by screws 154 and contains the screw 155, by which a tension may be placed upon the hub 151, so as to prevent any undue rotation of said hub, but without interfering with the proper movement of the hub during the rotation by intermittent movements of the wheel 149. The plate 150 fits against the rim of the wheel 149, and while being mounted upon the tubular hub 151 of said wheel itself has a tubular hub 156, which is in the form of an eccentric, as shown in Fig. 20, and has placed upon it the dog 157, the latter at its outer portion, by means of a spring 158, being connected with the face of the plate 150, the outer groove edges of the dog 157 engaging the inner surface of the rim of the wheel 149. The plate 150 is given simply an oscillatory motion on the tubular hub 151 and does not therefore at any time make a complete rotation. During the oscillatory motion of the plate 151 the dog 157 is caused to impart by intermittent motions a rotary motion to the wheel 149, the wheel 149, plate 150, and dog 157 constituting a clutch mechanism. When the plate 150 is given a partial rotary motion in one direction, the dog 157 will slip over the surfaces of the rim of the wheel 149 without imparting any motion to said wheel, and when the plate 150 is given a partial rotary motion in the other direction the dog 157 will engage said rim of said wheel and cause said wheel to have a rotary motion corresponding in extent with that of the plate 150, the dog 157 then locking the wheel 149 and plate 150 together. When the plate 150 is moved to carry the outer portion of the dog 157 in a direction toward the spring 158, (shown in Fig. 20,) said dog will not engage the rim of the wheel 149; but when the motion of said plate 150 is reversed the eccentricity of the tubular hub 156 will cause said dog 157 to lock against the rim of the wheel 149 and tie said wheel and said plate 150 together. Thus while the plate 150 has simply an oscillatory motion on the tubular hub 151 the wheel 149 will be compelled to rotate by successive or intermittent movements. The movement of the wheel 149 is by the mechanism presently to be described imparted to the piston-rod 138, the latter having, as above described, simply a direct longitudinal motion and no rotary motion.

I will first describe the motions for imparting to the plate 150 its oscillatory motion and then the means by which the rotary motion of the wheel 149 is caused to impart to the piston-rod 138 its direct horizontal motion.

The plate 150 is provided at opposite sides with the apertured ears 159 and 160, and the ear 160 is connected with a coiled spring 161, which extends downward and is secured to the sides of the cast standard 142. This spring is under a constant tension pulling downward on the ear 160, and consequently has a tendency to turn the plate 150 toward that side of the cast standard 142 to which the spring is secured. The ear 159 of the plate 150 is connected by a link-rod 162 with the pivoted lever 163, which is mounted upon the pin 99, located over the rear portion of the bed-plate 30, and has a forwardly-extending arm 164, which is engaged by the cam 165, located on the main driving-shaft 31. During each revolution of the main driving-shaft 31 the cam 165, acting against the arm 164 of the pivoted lever 163, operates when the paste-nozzle 119 is in its lower position to pull the rod 162 downward, and thereby to turn the plate 150, against the stress of the spring 161, toward that side of the cast standard 142 at which said rod 162 is located, and during the said rotation of the main driving-shaft 31 the cam 165 permits the spring 161 to restore the plate 150 to its normal position or that occupied before the said cam 165 exerted its influence in pulling downward on the rod 162. Thus during each revolution of the driving-shaft 31 the motion of the plate 150 is caused first in one direction by the downward pull of the rod 162 and then in the reverse direction by the downward pull of the spring 161, while the latter is restoring the plate 150 to its normal position.

The means for imparting the oscillatory motion to the plate 150 having been described and it having been hereinbefore described how the motion of the plate 150 is caused to impart an intermittent rotary motion to the wheel 149, I will now describe the means by which the motion of the wheel 149 is caused to impart a direct horizontal motion to the piston-rod 138.

Upon the front face of the wheel 149 is secured, by means of screws 166 and 167, the slidable plate 168, the said plate 168 being slotted, as shown in Fig. 19, to receive the said screws, while the heads of said screws retain the plate 168 close against the face of the wheel 149. The plate 168 has a central opening through which the piston-rod 138 may be freely passed, and said plate at the wall of said opening at one side of said rod 138 is threaded correspondingly with the rod 138, this threaded portion of the plate 168 being numbered 169. The central opening in the plate 168, through which the piston-rod 138 is passed, is elongated, so that the said rod may be freely passed through said opening and through the tubular hub 151 of the wheel 149, and preparatory to the insertion of the piston-rod 138 through the plate 168 the latter is by hand pushed at one end, so as to carry its threaded portion 169 out of the way of the path of the rod 138, and after the rod 138 has been inserted through the plate 168 and the tubular hub 151 the hand is released from the plate 168, and the spring 170, Fig. 18, connected with said plate, will then cause the plate 168 to move and carry its threaded portion 169 against the piston-rod 138, the threads of said portion 169 directly engaging and meshing with the thread on said piston-rod 138. After the plate 168 has thus engaged the thread of the piston-rod 138 the plate 168 will be clamped in rigid position by the turning of the screw 167, the latter being provided with a handle-bar 171 for its convenient operation without the use of a screw-driver. The screw 166 does not bind tightly against the plate 168, but simply serves to snugly retain the said plate close against the face of the wheel 149, whereas the screw 167 is intended to be a clamp-screw and when tightened against the plate 168 prevents the latter from having any sliding motion. The threaded portion 169 of the plate 168 locks against the piston-rod 138, while permitting it to have the proper horizontal motion; but since it may be desirable at times to withdraw the cylinder 120 and rod 138 from the machine I provide the clamp-screw 167 and make the plate 168 slidable, since thereby when the clamping-screw 167 is slightly loosened from the plate 168 the latter may by pressure applied upon one end be caused to carry its threaded portion 169 from contact with the piston-rod 138, and at such time the said rod may be directly withdrawn from the machine, the cylinder 120 having been released, as hereinbefore described, by the elevation of the catch 144 and the axial turning of the arm 143 from the recess 145 of the sleeve 141. The plate 168 having its threaded portion in engagement with the thread on the piston-rod 138 and being compelled to have a rotary motion with the wheel 149 carrying it is the element which compels the piston-rod 138 to have its direct traveling motion. Since the threaded portion 169 of the plate 168 turns upon while in engagement with the piston-rod 138 and since said rod 138 is held against rotation by means of the screw 140, the said rod 138 is compelled and only permitted to have a direct traveling motion, the threaded portion 169 of the plate 168 forcing said rod to travel forward.

After the paste has been exhausted from the cylindrical reservoir 120 said reservoir will be freed from the sleeve 141 and the threaded portion 169 will, in the manner hereinbefore described, be freed from the piston-rod 138, and at such time the cylinder 120, with its rod 138, may be immediately withdrawn from the machine and said cylinder 120 be then recharged with the paste and restored to the sleeve 141, the piston-rod 138 passing directly through the opening in the plate 168 and tubular sleeve 151. Upon the return of the rod 138 through the plate 168 the operator will permit the spring 170 to again restore the threaded portion 169 of the plate 168 into engagement with the thread on the said rod 138, and thereupon the operator will tighten the clamping-screw 167, so that said plate 168 shall be maintained in rigid engagement with the rod 138.

The wheel 149 is by the clutch mechanism, as hereinbefore described, given an intermittent rotary motion and through the plate 168 imparts a direct intermittent travel to the piston-rod 138 and piston 137, with the result that the piston 137 will express in limited quantities the paste through the flexible tube 121 and into and through the lower contracted portion 122 of the nozzle 119.

The motion of the plate 150 in one direction is of course limited by the amount of throw which the cam 165 imparts, through the rod 162, to the same, and the motion of plate 150 in the reverse direction under the action of the spring 161 is limited by the contact of the stop-plate 190 against the stop-screw 191, secured in the lug 192 on the cap 153, located over the tubular bearing 151 of the wheel 149. The screw 191 is provided in order that the stop checking the throw of the plate 150 under the action of the spring 161 may be adjustable, thereby to regulate the extent of movement the plate 150 shall have, and consequently the extent of movement which shall be imparted to the piston-rod 138 and piston 137 during each of the intermittent movements of the wheel 149.

*The means for controlling and turning downward the portion of the cigar-wrapper overhanging the outer edge of the thimble.*—The means for controlling and turning downward that portion of the cigar-wrapper which may overhang the angular side 94 of the thimble 85 consists of the arm 172, having a broadened outer end or plate 173, carrying at its edge adjacent to the thimble 85 a strip of rubber or other flexible material 274, Figs. 1 and 7, together with suitable means operated from the main driving-shaft 31 for imparting to said arm 122 the proper movements for enabling the strip of flexible material 274 to act upon the overhanging portion of the cigar-wrapper. The arm 172 is pivoted between the upturned ears 273, Figs. 1 and 2, of the plate 174, which is pivotally mounted upon the bearing 175, and by means of a spring 176, coiled around its base, is given a tension inward, so that the arm 172 shall normally be under a tension tending to turn its plate end 173 inward toward the rear and from the thimble 85. The plate 174 is pivotally mounted, so that the arm 172 may normally thus turn inward toward the rear from the thimble 85, this being its normal at-rest position, the then front edge of the plate 173 at the end of the arm 172 being just about in line with the center of the recess 86 in the thimble 85, as indicated in Figs. 1 and 7. The arm 172 is pivoted between the upturned ears 273 in order that said arm may also have a rocking motion by which its plate end 173 may move downward and upward, and the end of the arm 172 toward the left, looking at Fig. 1, is below the adjusting-screw 177, carried by an arm 178, secured to a rock-shaft 179, mounted in a bearing 180, and at its right-hand end carrying an arm 181, at whose outer end is a roller 182, in contact with the periphery of a cam 183, Figs. 1, 2, 4, 31, and 32. The cam 183 rotates with the motion of driving-shaft 31 and during its rotation acts, through the arm 181, to rock the shaft 179, and thereby turn the arm 178 either downward against the left-hand end of the arm 172 or permit said arm 178 to elevate from said arm 172. When the arm 178 is by the cam 183 permitted to elevate, the weight of the right-hand portion of the arm 172 will cause said portion to descend, and when the cam 183 pushes frontward on the arm 181 and through the shaft 179 depresses the arm 178 toward the left-hand end of the arm 172 the plate end 173 of the latter will be caused to elevate. Thus the cam 183, arm 181, shaft 179, and arm 178 control the rocking or up-and-down motion of the arm 172. The adjusting-screw 177 is provided at the front end of the arm 178 in order that the amount of rocking motion which may be given to the arm 172 may be conveniently regulated or adjusted without having recourse to the cam 183. The arm 172, carrying the blade or broadened end 173, also has a horizontal pivotal motion to the effect that the bearing-plate 174, which sustains said arm 172, is under the influence of the spring 176, which tends to move it in one direction, and is also under the influence of the cam 184, Figs. 37 and 38, which is adapted to engage the roller 185, Figs. 1, 2, and 4, secured upon the end of the arm 186, which is in one piece with the pivotally-mounted plate 174. The spring 176 by exerting its tension to turn the arm 172 inward toward the rear also performs the function of keeping the roller 185 against the edge of the cam 184. The cam 184 is in the form of a plate secured upon the plate 187, which is secured to the driving-shaft 31, the cam 184 being secured to the plate 187 by means of screws which pass through slots in the cam 184 and permit of the adjustment of said cam, whereby to regulate the extent of action the said cam 184 shall have upon the arm 186 and arm 172. The cam 183 controls the up-and-down or rocking motion of the arm 172, and the cam 184, by acting through the arm 186 and pivoted plate 174, controls the horizontal pivotal motion of the arm 172. When the parts are in the position in which they are shown in Fig. 1, the arm 172 is in its normal at-rest location, and upon the starting of the machine in motion the cam 184 first acts, through the arm 186 and plate 174, to turn the plate end 173 frontward above that portion of the cigar-wrapper which may then be overhanging the angular edge 94 of the thimble 85, and thereupon while said cam 184 is maintaining the said end 173 of the arm 172 in its forward position the cam 183 will act to permit the arm 178 to elevate, and thereby cause the arm 172 to turn downward at its right-hand end, whereby the flexible strip 274 of said arm 172 will move downward and cause any projecting portion of the cigar-wrapper to turn downward close against the angular edge 94 of the thimble 85, in which position the said wrapper will be under control and a more perfect head on the cigar result. The continued motion of the cams 183 and 184 with the main driving-shaft 31 does not for a short time affect the position of the arm 172, which has then been turned frontward over the tobacco-wrapper and then moved downward against the overhanging portion of said wrapper; but as the cams 183 184 continue on their rotation the cam 184 permits the arm 172 to finally turn inward again toward the rear to the position shown in Fig. 7, and the cam 183, at its concluding motion, causes the outer portion of the arm 172 to again elevate. The arm 181, which engages the cam 183, is kept against the periphery of said cam by means of a small spring 188, Fig. 2, located upon the plate 174 and directly below the left-hand end of the arm 172. The spring 188, pressing upward against the lower side of the left-hand end of the arm 172, keeps said end of said arm against the lower end of the screw 177, and consequently causes, through the arm 178 and pin 179, the arm 181 to engage the cam 183. The spring 188 also has a tendency to throw the right-hand end of the arm 172 downward when such result is permitted by the cam 183.

I regard the strip of flexible material 274 at the outer end of the arm 172 as of great importance, since thereby the said arm 172 may with great freedom and closeness of contact act upon that portion of the cigar-wrapper which may be overhanging the edge of the thimble 85 and without any danger of injury to or straining the wrapper or pulling it in irregular lines from over the edge of said thimble. In the absence of the strip of flexible material 274 the then rigid edge of the arm 172 would have to be nicely adjusted with respect to the thimble 85 and would have to be sufficiently removed from said thimble not to crush or bind against the overhanging portion of the cigar-wrapper. The flexible strip 274 on the end of the arm 172 for contact with the cigar-wrapper enables the direct engagement with the wrapper, and consequently the wrapper is placed under positive, though yielding, control and is correctly managed without injury to itself or interference with the required duties of the knife 95.

*Means for withdrawing the cigar from the clamp 65 and trimming the tuck end of same.*— The means for withdrawing the cigar after the completion of the head of same and trimming the tuck end of the cigar comprise the cutters or knives 193 and 194, together with the mechanism for operating said knives, Figs. 1, 2, and 5. The knives 193 and 194 are pivotally mounted upon the screw 195, and the shank ends of said knives are slotted, as shown in Fig. 5, to receive the pins 196, formed on the bifurcated front end of the horizontally-sliding plate 197, which carries a roller 198 within the rim of the cam 199, Figs. 41 and 42, the latter being keyed upon the driving-shaft 31 by means of feather 200 on said shaft. The rear end of the plate 197 has an open center and is guided upon the hub 201 of said cam 199. The cam 199 while being keyed upon the shaft 31 is otherwise free to slide lengthwise upon the said shaft. At the right-hand side of the plate 197 the hub 201 of the cam 199 is engaged by a rear portion 202 of the carriage 203, which carriage is mounted to slide upon the stationary shaft 59, and at its rear portion 202 loosely engages the hub 201 of the cam 199, so as to compel said cam 199 to follow the carriage 203 without at the same time interfering with the proper rotation of the said cam 199 and its hub 201. The carriage 203 is in the shape of a casting, and at its front edge carries the lug 204, against the side of which the knives 193 and 194 are pivotally mounted upon the screw or bolt 195. The rear portion 202 of the carriage 203 is bifurcated to pass upon the hub 201 of the cam 199, as shown in Fig. 5. At its upper side the carriage 203 carries the clamp 205, the parts of which may be tightened together by means of the bolt and nut 206, and between the parts of which is held the rod 207, which extends lengthwise of the machine, and at its right-hand end is pivotally secured in the upper forked end of the lever-arm 208, which at its lower end is integral with the transverse sleeve 209, pivotally secured adjacent to the bed-plate 30 upon the pin 210. The sleeve 209 is adapted to have a rocking motion upon the pin 210, and below the driving-shaft 31 said sleeve 209 is formed with an upwardly-extending arm 211, Fig. 2, which is engaged by the face of the cam-wheel 212, Figs. 43 and 44, mounted upon the driving-shaft 31. Below the bed-plate 30 the sleeve 209 is connected with a coiled spring 213, which exerts a tension on the sleeve 209 sufficient to keep the arm 211 of said sleeve against the face of the cam 212, with the result that the movement of said sleeve and the vertical lever-arm 208, carried thereby, is kept under the control of the cam 212. The purpose of the cam 212, lever-arm 208, and connecting-rod 207 is to effect a proper sliding movement of the carriage 203 and the parts connected therewith—to wit, the knives 193 194, plate 197, and cam 199—on the shaft 59 and driving-shaft 31, said carriage being by said cam 212 moved toward the cigar-clamp 65 when it is desired that the knives 193 and 194 shall close upon the tuck end of the cigar, and then outward to the right from said cigar-clamp 65 after the said knives have closed with sufficient firmness upon the tuck end of the cigar to simply grip (without cutting) the same, and then a slight further distance outward toward the right after said knives have trimmed the tuck end of the cigar, so as to permit the cigar then supported at its head end in the open clamp 65 to fall from the machine. The upper knife 193 is at its lower shank end connected by a spring 214, Fig. 5, with the lower side of the rear portion 202 of the carriage 203, and this spring 214 is extended when the knives 193 194 separate from one another under the forward thrust of the plate 197 by the cam 199. The spring 214 has its force transmitted through the knife 193 to the plate 197 and causes the roller 198, carried by said plate 197, to follow the rim of the cam 199, the force of said spring 214 being directed rearward on the plate 197. When the machine is in its normal at-rest position, the knives 193 and 194 are in their closed condition, (shown in Fig. 5,) and during the first part of the rotation of the driving-shaft 31 the cam 199 will operate to move the plate 197 frontward, and thereby open the knives 193 and 194 from one another, so that said knives may be separated from one another and be enabled to pass upon the tuck end of the cigar then held in the cigar-clamping frame 65. The knives 193 and 194 open, as above described, almost immediately upon the starting of the driving-shaft 31 in motion, and during the continued motion of the said driving-shaft 31 the cam 212, acting upon the arm 211, sleeve 209, lever-arm 208, and rod 207, causes the carriage 203 to advance toward the cigar-clamping frame 65 with the knives 193 and 194 in their wide-open position, the result being that the knives will pass upon the tuck end of the cigar while the latter is revolving with the clamping-frame 65. After the carriage 203 has attained its advanced position the cam 212 will there maintain it temporarily with the knives 193 and 194 still open; but during the continued motion of the driving-shaft 31 the cam 199 will move its outwardly-projecting portion 215 (see Fig. 5) into contact with the roller 198, carried by the plate 197, and upon this projecting portion 215 of the cam 199 reaching the roller 198 of the plate 197 the spring 214 will lightly close the knives 193 194 against the tuck end of the cigar simply that said knives may pinch without cutting the cigar, this happening just prior to the elevation of the upper half of the cigar-clamping frame 65, and thereupon the continued rotation of the driving-shaft 31 results in the cam 212 retracting the carriage 203, with the parts carried thereby, to its outward position toward the left, said cam 212 permitting said carriage and its parts to momentarily remain stationary just prior to reaching their full outward position. When the carriage 203 has reached nearly to the extreme outward position to the right under the influence of the cam 212, the cam 199, acting against the knives 193 and 194, closes the latter together with firmness to cut off the tuck end of the cigar, at this time the head end of the cigar resting on the lower half of the clamp 65, while the tuck end of the cigar is held between the knives 193 and 194. As soon as the knives 193 and 194 cut entirely through the cigar the carriage 203, under the action of the cam 212, moves very slightly—about one-eighth of an inch—farther outward to the right, so that the knives 193 and 194 may be entirely freed from the cigar and the latter be permitted to remain unsupported, and consequently to fall from the machine. When the carriage 203 is advanced the proper distance toward the cigar-clamp 65 and the knives 193 and 194 have passed upon the tuck end of the cigar and the projecting portion 215 of the cam 199 has reached the roller 198, carried by the plate 197, the knives 193 and 194 are, as above described, allowed to bind against the tuck end of the cigar, and this is merely for the purpose of enabling the knives 193 and 194 during the outward motion or travel of the carriage 203 toward the right to withdraw in a longitudinal direction the cigar from the thimble 85 and almost entirely from the then open clamp 65. The knives 193 and 194 cut or trim the tuck end of the cigar after the carriage 203 has almost entirely reached its extreme outward position to the right. The knives 193 and 194, with means for operating them, therefore effect the withdrawal of the cigar from the thimble 85 and substantially from the then open cigar-clamp 65 and also thereafter the trimming of the tuck end of the cigar. Since it is highly desirable that cigars varying in length may have their heads formed by means of the machine made the subject of this application, it is necessary that the travel of the cutting-knives 193 and 194 toward the cigar-clamp and thimble may be regulated, and hence the carriage carrying said knives 193 and 194, with their operative parts, is provided with the clamp 205 for securing said carriage to the operating-rod 207, the said clamp 205 being capable of being secured to the rod 207 at any suitable point along the length of the latter. When short cigars are being manufactured, the carriage 203 will be secured toward the left-hand end of the aforesaid rod 207, so that the knives 193 and 194 may reach and properly trim the cigars, and when, for instance, long cigars are being made the carriage 203 will be moved outward toward the right and secured to the rod 207 in order that during the inward advancing motion of the carriage 203 the knives 193 and 194 shall only pass a proper distance upon the end of the cigars.

Operation: The operation of the machine made the subject of this application will be sufficiently understood from the description hereinbefore presented without a further detailed explanation.

The driving-shaft 31 makes one complete revolution and then automatically stops and does not start again until the operator releases the hooked arm or pawl 33 from the shoulder 48 of the plate 36, constituting a part of the main clutch mechanism at the left-hand end of the said driving-shaft. During one revolution of the driving-shaft 31, the cigar then held within the clamping frame 65 is caused to make several revolutions, and the motion of the one driving-shaft 31 is communicated to all of the cams for actuating the several parts of the machine. When the machine is in its normal at-rest position, the paste-nozzle 119 is in its upper position, (shown in Fig. 3,) the upper section 57 of the cigar-clamp casing and the upper section 55 of the cigar-clamp 65 are in their elevated or open position, (shown in Fig. 6,) the knives 193 and 194 are in their closed position, (shown in Fig. 5,) with the carriage 203 in stationary position outward toward the right, the wrapper controlling and folding arm 172 is at its inward position, (shown in Figs. 1 and 7) and the wrapper-trimming knife 95 is in its upper position, with its cutters or blades 96 elevated above the end of the thimble 85, and when the said parts are thus in their normal at-rest position the operator will place the cigar upon the lower section 56 of the cigar-clamp 65, with the head end of the cigar in the recess 86 of the thimble 85, and see that the loose portion of the wrapper at the head end of the cigar is extended frontward over the thimble 85, with the longitudinally-projecting portion of said wrapper overhanging the angular edge 94 of the said thimble. The cigar being thus in position, the operator will free the pawl 33 from the clutch-plate 36 and allow the motion of the belt-wheel 32 to be imparted to the main driving-shaft 31. This having been done, the cam 199 will open the tuck-cutting knives 193 and 194, the upper section 57 of the cigar-clamping casing and the upper section 55 of the cigar-clamp will close down upon the cigar, the paste-nozzle 119 will descend, and the free end 173 of the arm 172 will move forward over that portion of the tobacco-leaf overhanging the angular edge of the thimble 85. Upon the descent of the paste-nozzle 119 and arm 173 the knife 95 will perform, by the means hereinbefore described, the trimming off of the surplus wrapper overhanging the thimble 85, the paste-nozzle 119 will perform its hammering action, and the paste will be properly supplied through the flexible tube 121 and the paste-nozzle. During the continued rotation of the driving-shaft 31 the cigar will be given a rapid rotation, the paste-nozzle 119 will remain closed down and stationary for a given length of time, the knives 193 and 194 will advance upon the tuck end of the cigar, and the broadened end 173 of the arm 172 will move rearward and then upward to its normal position. The continued rotation of the main driving-shaft 31 will then effect the opening upward of the cigar-clamp and the upward movement of the paste-nozzle 119, and thereupon the carriage 203 will move outward to the right and the knives 193 and 194 will carry with them the cigar and then trim the tuck end of the cigar, said carriage thereafter moving about one-eighth of an inch farther outward to the right to fully release and leave unsupported the cigar. The driving-shaft 31 will thereupon have completed its one revolution and left all of the parts of the machine in their normal at-rest condition and position hereinbefore described. The operator will thereupon introduce another cigar to the clamp-frame and thimble and again trip the pawl 33 for restarting the machine. This operation will be continued as long as necessary, each rotation of the main driving-shaft 31 in connection with the parts hereinbefore described completing a cigar.
What I claim as my invention, and desire to secure by Letters Patent, is—

1. In a machine for making cigars, the thimble to receive the head end of the cigar, combined with a rotatory clamping-frame in separable sections, each section being provided with the gear-teeth, and gearing for rotating said frame; substantially as set forth.

2. In a cigar-making machine, the thimble having the recess to receive the head end of the cigar, combined with the rotatory cigar-clamping frame in separable sections, each section provided with the gear-teeth, yielding surfaces within said frame for binding against the cigar, and gearing for rotating said frame; substantially as set forth.

3. In a cigar-making machine, the thimble having the recess to receive the head end of the cigar, combined with the rotatory clamping-frame in separable sections and having the gear-teeth, means operable from the driving-shaft for opening said frame to receive the cigar and then closing said frame to hold the cigar, and gearing also operable from the driving-shaft for rotating said frame with the cigar therein; substantially as set forth.

4. In a cigar-making machine, the thimble having the recess to receive the head end of the cigar, combined with the rotatory cigar-clamping frame in separable sections each section having the gear-teeth, the gear-wheel 72 in engagement with the teeth on both sections of said cigar-clamping frame, and means for rotating said gear-wheel for communicating motion to said cigar-clamping frame; substantially as set forth.

5. In a cigar-making machine, the thimble having the recess to receive the head end of the cigar, combined with the rotatory cigar-clamping frame in separable sections, the clamp-casing in separable sections and inclosing the sections of said clamping-frame, means for closing said clamp-sections and said casing-sections together, and means for rotating said clamp-sections within said sections of the clamp-casing; substantially as set forth.

6. In a cigar-making machine, the thimble having the recess to receive the head end of the cigar, combined with the cigar-clamping frame in separable sections and having the gear-teeth, the clamp-casing also in separable sections and inclosing the sections of said clamping-frame, and gearing operable from the driving-shaft and engaging the gear-teeth of said clamping-frame for rotating the latter; substantially as set forth.

7. In a cigar-making machine, the thimble having the recess to receive the head end of the cigar, combined with the rotatory cigar-clamping frame in separable sections, and having the springs 68 and 69 secured to the opposite edges of the said sections for binding against the cigar, and means for rotating said cigar-clamping frame, the said springs being held at one end and free to yield at the other end; substantially as set forth.

8. In a cigar-making machine, the thimble having the recess to receive the head end of the cigar, combined with the rotatory cigar-clamping frame in separable sections, the clamp-casing also in separable sections and inclosing the sections of said clamping-frame, means for elevating and lowering the upper section of the said clamp-casing for opening and closing said clamping-frame, and means for rotating said clamping-frame within the said casing, the latter being rigid or having no rotary motion; substantially as set forth.

9. In a cigar-making machine, the thimble having the recess to receive the head end of the cigar, combined with the rotatory cigar-clamping frame in separable sections, the clamp-casing also in separable sections and inclosing the sections of the said clamping-frame, means for raising and lowering the upper section of the said clamp-casing for opening and closing said clamping-frame, the gear-teeth on the sections of said clamping-frame, and gearing in engagement with the said gear-teeth for rotating said sections of the cigar-clamping frame; substantially as set forth.

10. In a cigar-making machine, the thimble having the recess to receive the head end of the cigar, combined with the rotatory cigar-clamping frame in separable sections and having the gear-teeth, the clamp-casing in separable sections for inclosing the sections of said clamping-frame and having the grooves or runways for engaging the corresponding parts of said clamping-frame sections, means for separating said clamp-casing sections for opening said clamping-frame to receive the cigar, means for closing said clamp-casing sections for closing the clamping-frame upon the cigar, and gearing for engaging the said gear-teeth and rotating said cigar-clamping frame within said clamp-casing; substantially as set forth.

11. In a cigar-making machine, the thimble having the recess to receive the head end of the cigar, the main driving-shaft, the rotatory clamping-frame in separable sections to receive and clamp the cigar, the clamp-casing inclosing said cigar-clamping frame and in separable sections, and means connected with the said driving-shaft for elevating and lowering the upper section of said casing for opening and closing said clamping-frame inclosed therein, and means operable from said driving-shaft for rotating said clamping-frame within said clamp-casing while the latter is held in rigid closed position; substantially as set forth.

12. In a cigar-making machine, the thimble having the recess to receive the head end of the cigar, the driving-shaft, the rotatory clamping-frame in separable sections for holding the cigar, the clamp-casing also in separable sections inclosing the sections of said cigar-clamping frame, and means connected with the said driving-shaft for raising and lowering the upper section of said clamp-casing for opening and closing said cigar-clamping frame, said cigar-clamping frame having the series of gear-teeth, combined with the gear-wheel 72 in engagement with the gear-teeth on said cigar-clamping frame, the pinion 71 connected with said gear-wheel 72, the locking-dog 74 also connected with said gear-wheel 72, and the gear-wheel 70 on the driving-shaft and having teeth along a portion of its periphery, and on a portion of its periphery where there are no teeth, the plain flange 73 to be engaged by the locking end of said dog 74, whereby during a part of the rotation of the said wheel 70, the motion of the latter will be cut off from the said rotatory cigar-clamping frame; substantially as set forth.

13. In a cigar-making machine, the thimble having the recess to receive the head end of the cigar, the rotatory cigar-clamping frame adjacent to said thimble to bind upon and rotate with the cigar to be headed, and means for rotating said clamping-frame, combined with means for withdrawing the finished cigar in a longitudinal direction from said thimble and clamping-frame; substantially as set forth.

14. In a cigar-making machine, the thimble having a recess to receive the head end of the cigar, the rotatory clamping-frame adjacent to said thimble for receiving and rotating with the cigar to be headed, and means for rotating said frame, combined with means for withdrawing the cigar longitudinally from said thimble, and knives for trimming the tuck end of the cigar after the latter has been withdrawn from said thimble; substantially as set forth.

15. In a cigar-making machine, the thimble having the recess to receive the head end of the cigar, the rotatory cigar-clamping frame adjacent to said thimble, and means for rotating said frame with the cigar therein, combined with the knives 193, 194 in line with said clamping-frame, the carriage carrying said knives, means for moving said carriage to advance toward said clamping-frame, and then recede from the same, means for opening or separating said knives to pass upon the tuck end of the cigar when the said carriage is advancing toward the said clamping-frame, and means for closing said knives upon the tuck end of the cigar and trimming said end; substantially as set forth.

16. In a cigar-making machine, the thimble having the recess to receive the head end of the cigar, the rotatory clamping-frame adjacent to said thimble for holding and rotating with the cigar to be headed, and means for rotating said clamping-frame, combined with the tuck-cutting knives, the carriage carrying said knives, means for advancing said carriage toward said clamping-frame and then withdrawing said carriage in the direction from said clamping-frame, means for opening said knives to pass upon the tuck end of the cigar, means for closing said knives upon the tuck end of the cigar to enable said knives on the receding motion of said carriage to withdraw the cigar from said thimble, and means for then causing said knives after such withdrawal of the cigar, to trim off the tuck end of the cigar; substantially as set forth 17. In a cigar-making machine, the thimble having the recess to receive the head end of the cigar, the rotatory clamping-frame adjacent to said thimble for receiving and rotating with the cigar, and means for rotating said cigar-clamping frame, combined with the tuck-cutting knives, the carriage carrying said knives, means for causing said carriage to advance toward said clamping-frame and then to recede therefrom, means for opening said knives to pass upon the tuck end of the cigar upon the advance of said carriage, means for closing said knives upon the tuck end of the cigar prior to the receding motion of said carriage to enable said knives to withdraw the cigar longitudinally from said thimble and substantially from said clamping-frame, leaving the head end of the cigar resting upon said clamping-frame, and means after such withdrawal of the cigar, for causing said knives to trim off the tuck end of the cigar, said carriage then, by the aforesaid means which operate it, having a very slight further receding movement to entirely free said knives from the cigar and leave the latter unsupported at its tuck end; substantially as set forth.

18. In a cigar-making machine, the thimble having the recess to receive the head end of the cigar, the rotatory cigar-clamping frame adjacent to said thimble to receive the cigar and rotate with the same, and means for rotating said cigar-clamping frame, combined with the tuck-cutting knives, the carriage carrying said knives, means for moving said carriage toward said cigar-clamping frame and then withdrawing said carriage in a direction from said cigar-clamping frame, means for regulating the extent of movement said carriage shall have toward said clamping-frame with respect to the length of cigars being made, means for opening said knives to enable them to pass upon the tuck end of the cigar, and means for closing said knives upon the tuck end of the cigar for cutting off the same; substantially as set forth.

19. In a cigar-making machine, the thimble having the recess to receive the head end of the cigar, the rotatory clamping-frame in separable sections adjacent to said thimble for receiving and rotating with the cigar, and means for rotating said clamping-frame, combined with means for engaging the tuck end of the cigar and withdrawing said cigar in a longitudinal direction from said thimble; substantially as set forth.

20. In a cigar-making machine, the thimble having the recess to receive the head end of the cigar, the rotatory clamping-frame in line with said thimble to receive the body of the cigar, means for imparting rotary motion to the said frame and the cigar therein, and the clamp-casing containing said cigar-clamping frame, combined with means for holding said casing in rigid position during the rotary motion of said clamping-frame, and means for withdrawing the cigar in longitudinal direction from said thimble; substantially as set forth.

21. In a cigar-making machine, the thimble having the recess to receive the head end of the cigar, the rotatory clamping-frame for receiving the body of the cigar and being in line with said recess, and means for imparting rotary motion to said clamping-frame and the cigar therein, combined with the clamp-casing containing said clamping-frame, means for holding said clamp-casing in rigid position during the rotation of said clamping-frame, and means for withdrawing the cigar after said clamping-frame has ceased to rotate; substantially as set forth.

22. In a cigar-making machine, the thimble having the recess to receive the head end of the cigar, the rotatory clamping-frame in line with said thimble for holding the body of the cigar, and means for rotating said clamping-frame, combined with the clamp-casing inclosing said clamping-frame, means for holding said clamp-casing in rigid position during the rotation of said clamping-frame, and means for trimming off the tuck end of the cigar after said clamping-frame has ceased to rotate; substantially as set forth.

23. In a cigar-making machine, the thimble having the recess to receive the head end of the cigar, the rotatory clamping-frame to hold the body of the cigar and rotate therewith, and means for rotating said clamping-frame, combined with the pair of tuck-cutting knives, means for causing said knives to engage the tuck end of the cigar and withdraw the cigar from said thimble, and means for then causing said knives to cut off the tuck end of the cigar; substantially as set forth.

24. In a cigar-making machine, the thimble having the recess to receive the head end of the cigar, the clamping-frame adjacent to said thimble for receiving the body of the cigar and rotating therewith, and means for rotating said clamping-frame, combined with the pivotally-mounted tuck-cutting knives 193, 194, the plate 197 engaging the shank ends of said knives, and the cam 199 for reciprocating said plate 197 and opening and closing said knives; substantially as set forth.

25. In a cigar-making machine, the thimble having the recess to receive the head end of the cigar, the rotatory clamping-frame to hold the body of the cigar and rotate therewith, and means for rotating said clamping-frame, combined with the tuck-cutting knives 193, 194, the plate 197 in engagement with the shank ends of said knives and adapted by its movement to open and close said knives, the cam 199 in engagement with said plate 197, and the spring 214 connected with the shank end of one of said knives, the form of said cam 199 permitting said spring 214 to close the knives upon the cigar without cutting into the latter, and said cam thereafter compelling said knives to cut off the tuck end of the cigar; substantially as set forth.

26. In a cigar-making machine, the thimble having the recess to receive the head end of the cigar, the rotatory clamp adjacent to said thimble to receive the body of the cigar and rotate therewith, and means for rotating said clamp, combined with the tuck-cutting knives 193, 194, the carriage 203 carrying said knives, the rod 207 connected with said carriage, the lever-arm 208 connected with said rod, the cam 212 on the driving-shaft for actuating said lever 208 and thereby imparting motion to said rod 207 and said carriage 203, and means movable with said carriage and operable from the driving-shaft for actuating said knives; substantially as set forth.

27. In a cigar-making machine, the thimble having the recess to receive the head end of the cigar, the rotatory clamping-frame adjacent to said thimble for receiving the body of the cigar, and means for rotating said clamping-frame, combined with the driving-shaft 31, the rigid shaft or rod 59, the carriage 203 mounted on said driving-shaft and said rod, the cam 199 on said driving-shaft and engaged by said carriage 203, the tuck-cutting knives carried by said carriage and operatively connected with said cam, and means connected with said driving-shaft for causing said carriage and said cam to advance toward the said cigar-clamping frame and thereafter, after said knives have engaged the cigar, to recede therefrom; substantially as set forth.

28. In a cigar-making machine, the thimble having the recess to receive the head end of the cigar, and rotatory means for holding the cigar, combined with the wrapper-trimming knife for trimming the surplus wrapper overhanging the outer edge of the said thimble, means for causing said knife to make a preliminary cut into said wrapper and then ascend free of said wrapper, and means for thereafter causing said knife to cut downward through the wrapper; substantially as set forth.

29. In a cigar-making machine, the thimble having the recess to receive the head end of the cigar, and rotatory means for holding the cigar, combined with the knife having the series of blades for trimming the surplus wrapper overhanging the outer edge of the said thimble, means for causing said knife to descend and make a preliminary cut in the wrapper and then ascend free of the wrapper, means for then imparting to said knife an intermittent motion so that said blades shall one after another cut into said wrapper, means for then temporarily holding the knife stationary against the said thimble to close the outer end of the recess therein during the rotation of the cigar, and means for then elevating said knife, the upper blade of said knife being materially longer than the other blades thereof; substantially as set forth.

30. In a cigar-making machine, the thimble having the recess to receive the head end of the cigar, and rotatory means for holding the cigar, combined with the wrapper-trimming knife having the apertures 117 and slot 118, the hollow sleeve 113 carrying the plate 97, the pins 116 on said plate to enter the apertures 117 of said knife, the screw 114 within said sleeve and by which said sleeve is secured to said thimble, and the spring within said sleeve and around said screw and by which said sleeve is spring-pressed toward said knife, the head of the said screw being within the bore of the said sleeve and adapted to permit said sleeve to be pulled outward on the said screw and against the stress of said spring so as to permit of the detachment of the said knife from said thimble; substantially as set forth.

31. In a cigar-making machine, the rotatory means for holding the cigar, combined with the thimble having the recess to receive the head end of the cigar and also having, at its lower side, the undercut groove 87, the bed-plate for said thimble and having the pin 89 therein, whose head 88 is within said groove, and the eccentric-pin 90 mounted in said bed-plate, the eccentric portion of said pin 90 being within an aperture in said pin 89 so that upon the turning of said pin 90 in one direction it will lock the thimble in rigid position, and upon the turning of said pin 90 in the reverse direction it will loosen said pin 89 and permit the withdrawal of the said thimble; substantially as set forth.

32. In a machine for making cigars, the rotatory means for holding the cigar, and the thimble having the recess to receive the head end of the cigar, combined with the knife for trimming the wrapper overhanging the outer edge of the said thimble, means for actuating said knife, and the wrapper-controlling arm 172 having adjacent to said thimble the strip of flexible material 274 adapted for folding downward at the outer side of said thimble, the overhanging portion of the cigar-wrapper; substantially as set forth.

33. In a machine for making cigars, the rotatory means for holding the cigar, and the thimble having the recess to receive the head end of the cigar, combined with the knife for trimming the wrapper overhanging the edge of the said thimble, the pivoted arm 172 having at its outer end the plate 173 and strip of flexible material 274, and means for actuating said arm 172 to move downward and carry the flexible strip 274 against the wrapper overhanging the outer edge of the said thimble and then move inward out of the way of said thimble and then upward to an at-rest position on a plane above the level of the outer edge of the said thimble; substantially as set forth.

34. In a machine for making cigars, the thimble having the recess to receive the head end of the cigar, the rotatory means for holding the cigar, and the knife for trimming the wrapper overhanging the edge of the said thimble, combined with the folder-arm 172 having at its outer end the flexible strip 274 for engaging and folding downward said overhanging portion of the wrapper, the plate 174 pivotally mounted and carrying between ears 273 the said folder-arm 172, arm 178 having the adjusting-screw 177 in contact with the short end of the said arm 172 above said plate 174, the spring 188 intermediate said plate 174 and that portion of the arm 172 below the said screw 177, the arm 186 extending inward from said plate 174, the arm 181 connected with said arm 178, the cam 184 engaging said arm 186, the cam 183 engaging said arm 181, and the spring 176 for normally turning said plate 174 and said arm 172 inward in a direction from said thimble, the cam 183 being adapted to control the upward-and-downward motion of said arm 172, and the cam 184 being adapted to effect the outward motion of said arm 172 toward the front to carry the flexible strip 274 into a position over the said overhanging wrapper preparatory to the descent of said flexible strip against said wrapper; substantially as set forth.

35. In a machine for making cigars, the thimble having the recess to receive the head end of the cigar, and rotatory means for holding the cigar, combined with the paste-cylinder 120, the tubular conveying means leading from said cylinder to said thimble for directing the paste to the cigar-wrapper, the piston 137 within said cylinder, the threaded piston-rod 138 connected with said piston and having the longitudinal groove or keyway 139, means for engaging said groove 139 to prevent said piston-rod from rotating, the plate 168 having a threaded portion 169 in engagement with the thread on said piston-rod 138, and means for imparting an intermittent rotary motion to the said plate 168, whereby said plate is caused to impart a direct travel to said piston-rod and said piston for expressing the paste from said cylinder; substantially as set forth.

36. In a machine for making cigars, the thimble having the recess to receive the head end of the cigar, and rotatory means for holding the cigar, combined with the paste-cylinder 120, the tubular conveying means leading from said cylinder to said thimble for directing the paste to the cigar-wrapper, the piston 137 within said cylinder, the threaded piston-rod 138 connected with said piston and having a longitudinal groove 139, means for engaging said groove 139 to prevent rotation of said piston-rod, the wheel 149 having the tubular hub 151 through which said rod passes, the plate 150 mounted upon said tubular hub and itself provided with the eccentric hub 156, the dog 157 mounted on said eccentric hub and adapted to engage when the plate 150 is moved in one direction, the rim of said wheel 149, means for imparting an oscillatory motion to said plate 150 in order that thereby the dog 157 may impart an intermittent rotary motion to said wheel 149, and the plate 168 secured to said wheel 149 and having the threaded portion 169 in engagement with the thread on said piston-rod 138, whereby during the intermittent rotary motion of said wheel 149 said plate 168 may effect a forward travel to said piston-rod and piston for expressing the paste from said cylinder; substantially as set forth.

37. In a machine for making cigars the thimble having the recess to receive the head end of the cigar, and rotatory means for holding the cigar, combined with the paste-cylinder 120, the tubular conveying means leading from said cylinder to said thimble for directing the paste to the cigar-wrapper, the piston 137 within said cylinder, the threaded piston-rod 138 connected with said piston and having the longitudinal groove 139, means for engaging said groove so as to prevent rotation of said piston-rod, the wheel 149 on said rod, means for imparting to said wheel an intermittent rotary motion, the plate 168 having the open center to receive said rod and provided with the threaded portion 169 to engage the thread on said rod, and the screws 166 and 167 passing through elongated slots in said plate 168 and securing said plate to said wheel 149, the said threaded portion 169 of said plate 168 being adapted to effect during the rotary motion of said wheel 149 the direct forward travel of said piston-rod 138 and piston 137 for expressing the paste from said cylinder; substantially as set forth.

38. In a machine for making cigars, the thimble having the recess to receive the head end of the cigar, and rotatory means for holding the cigar, combined with the paste-cylinder 120 having the projecting arm 143, the sleeve 141 within which said cylinder is mounted and which is formed with the recess 145 to receive said arm 143, the hinged catch 144 secured upon said sleeve for locking said arm 143 within said recess 145, the tubular conveying means leading from said cylinder to said thimble for directing the paste to the cigar-wrapper, the piston 137 within said cylinder, the threaded piston-rod 138 connected with said piston 137 and having the longitudinal groove 139, means for engaging said groove 139 to prevent the rotation of said piston-rod, the plate 168 having the central opening through which said rod 138 passes and which is provided with the threaded portion 169 to engage the thread on said rod 138, and means for imparting a direct rotatory motion to said plate 168 for causing said threaded portion 169 to effect a direct travel of the said piston-rod 138 and piston 137, the said plate 168 being slidable so that its threaded portion 169 may be relieved from the thread of the piston-rod 138 when it is desired, by freeing the catch 144, to withdraw the cylinder 120 with the piston 137 and rod 138 from the machine; substantially as set forth.

39. In a machine for making cigars, the thimble having the recess 86 to receive the head end of the cigar and provided upon its upper portion adjacent to the smaller end of said recess with the elevation 286 inclining inward and downward to said recess, and said thimble toward the larger end of said recess and along one edge of same being beveled off, as at 287, to substantially follow in a longitudinal direction the incline of said elevated portion 286, combined with rotatory means for holding the cigar while the head end of the latter is within said recess, the paste-nozzle 119 having the lower contracted portion 122 adapted to partly close the upper outer portion of the said recess and leave a space between itself and the said raised portion 286 for admitting the inward passage of the cigar-wrapper to the head of the cigar, means for raising and lowering said paste-nozzle, and means for supplying paste to said nozzle; substantially as set forth.

40. In a machine for making cigars, the thimble having the recess to receive the head end of the cigar and provided upon its upper portion adjacent to the smaller end of said recess with the elevation 286 inclining inward and downward to said recess and adapted to direct the loose portion of the cigar-wrapper on its passage into said recess; substantially as set forth.

Signed at New York, in the county of New York and State of New York, this 12th day of May, A. D. 1900.

JOHN R. WILLIAMS.

Witnesses:
CHAS. C. GILL,
GUNDER GUNDERSON.